T. P. PAYNE.
METAL WORKING MACHINE.
APPLICATION FILED SEPT. 16, 1913.

1,241,247.

Patented Sept. 25, 1917.
18 SHEETS—SHEET 1.

WITNESSES:

INVENTOR
T. P. Payne
BY
John D. Morgan
ATTORNEY

T. P. PAYNE.
METAL WORKING MACHINE.
APPLICATION FILED SEPT. 16, 1913.

1,241,247.

Patented Sept. 25, 1917.
18 SHEETS—SHEET 6.

WITNESSES:

INVENTOR
T. P. Payne
BY
John D. Morgan
ATTORNEY

T. P. PAYNE.
METAL WORKING MACHINE.
APPLICATION FILED SEPT. 16, 1913.
1,241,247.
Patented Sept. 25, 1917.
18 SHEETS—SHEET 9.
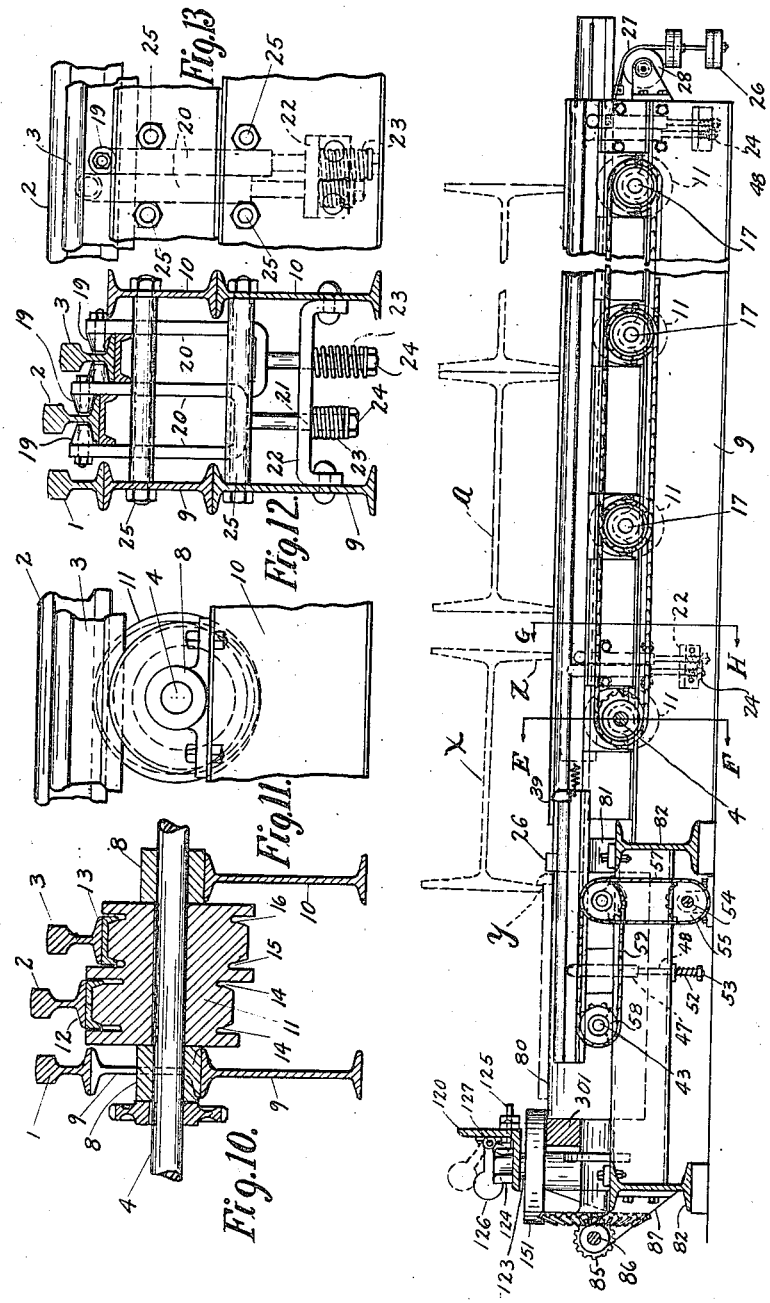

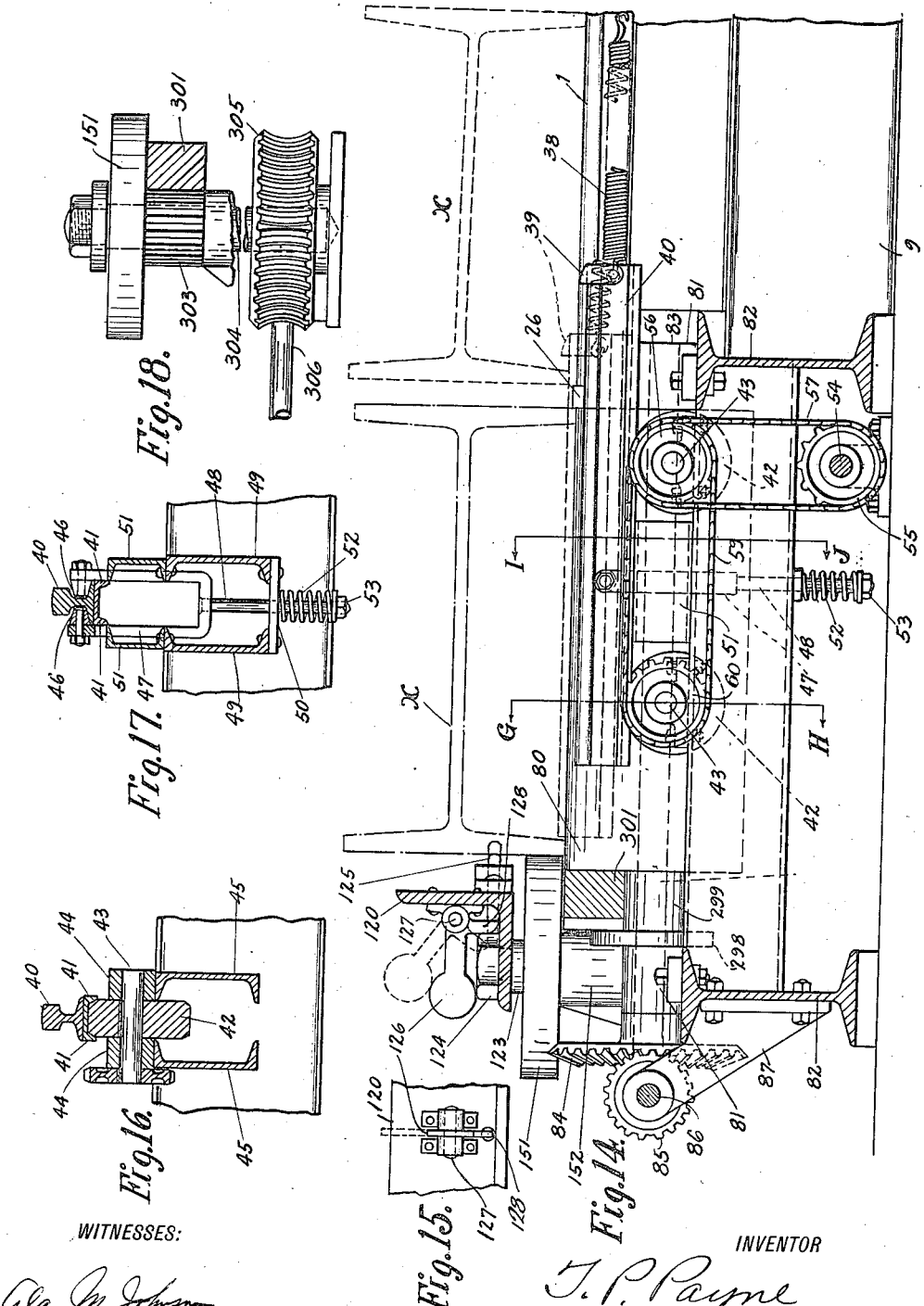

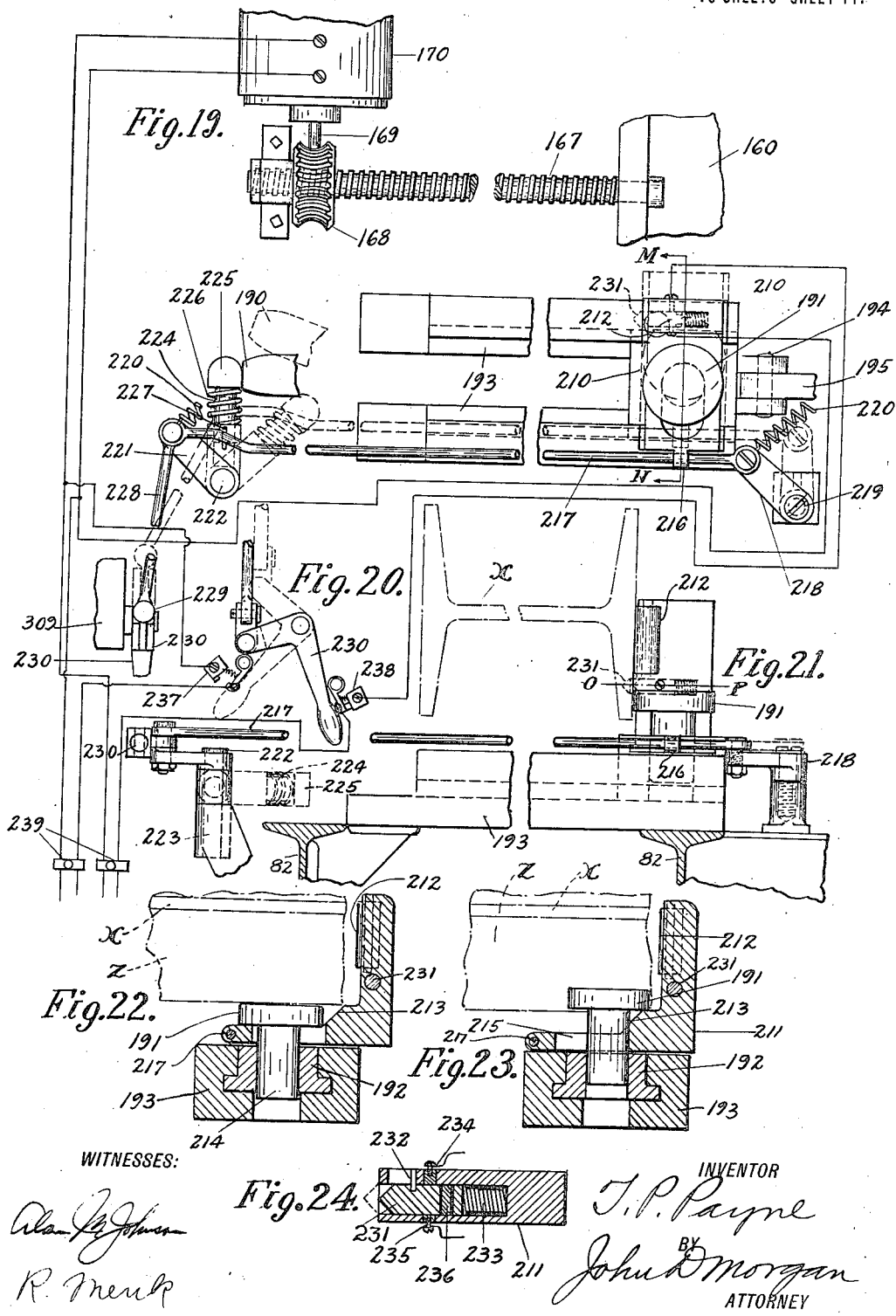

T. P. PAYNE.
METAL WORKING MACHINE.
APPLICATION FILED SEPT. 16, 1913.
1,241,247.
Patented Sept. 25, 1917.
18 SHEETS—SHEET 12.
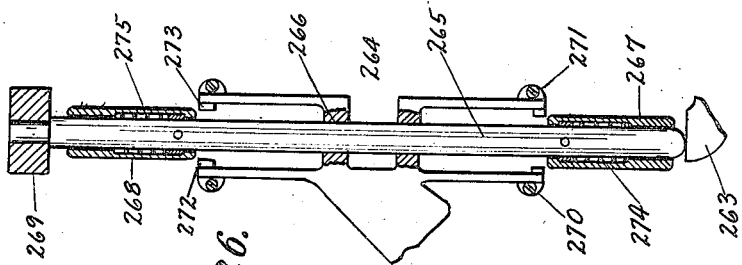
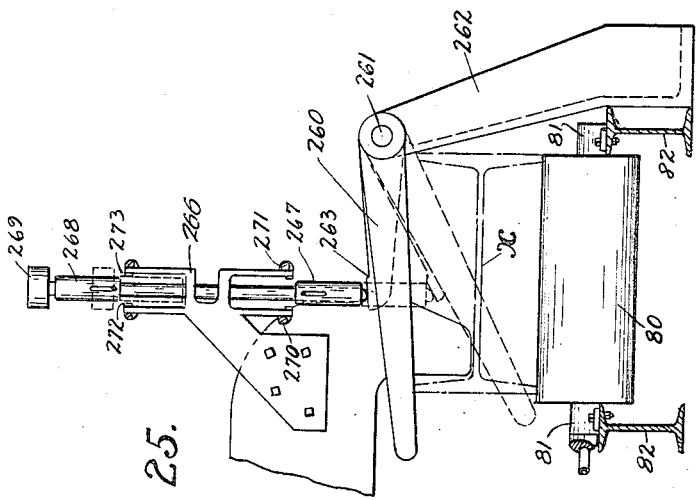

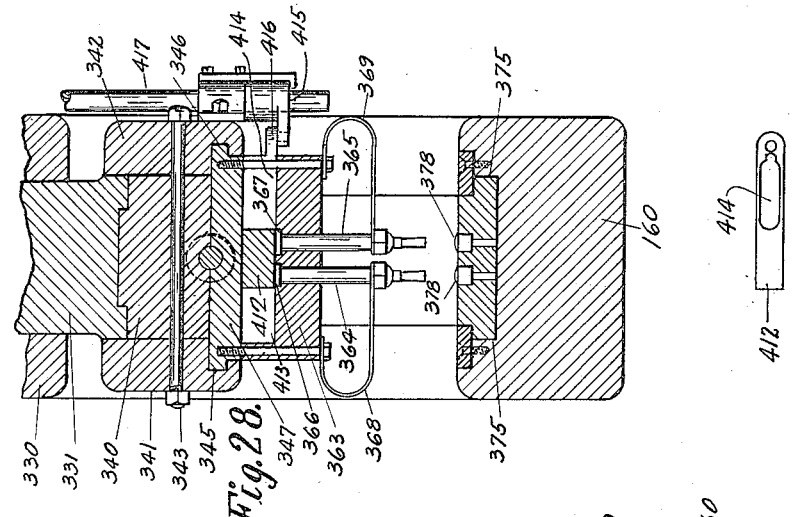

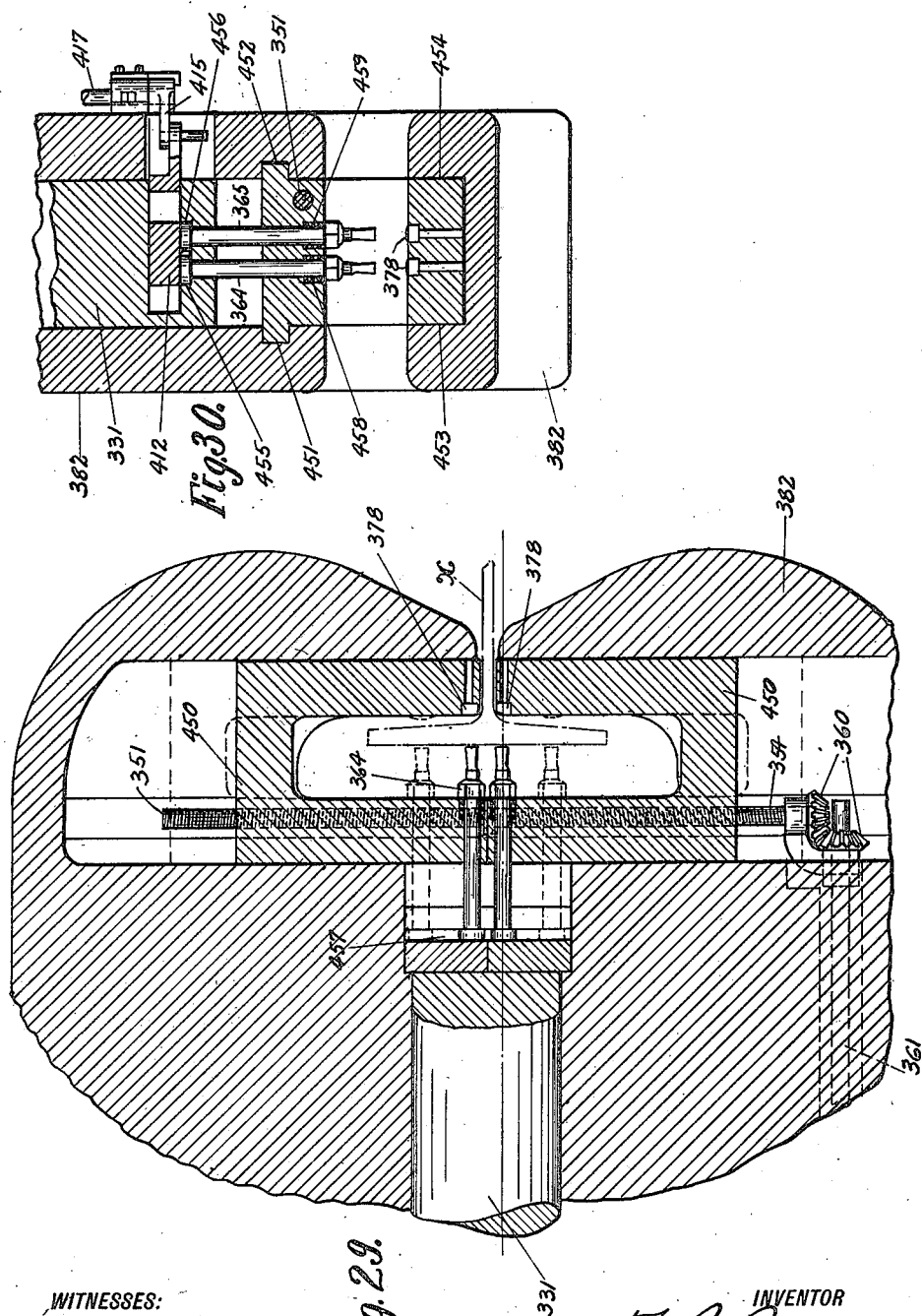

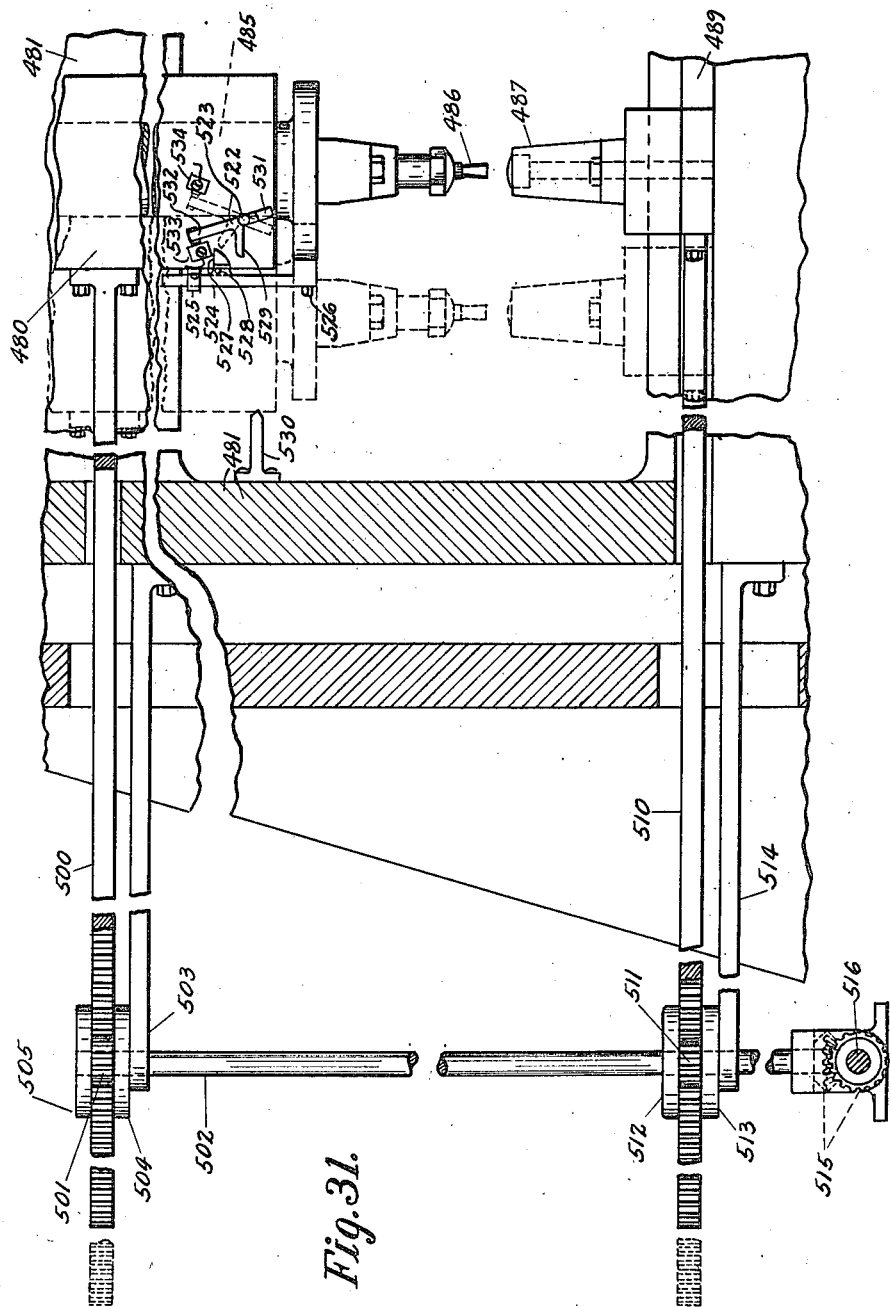

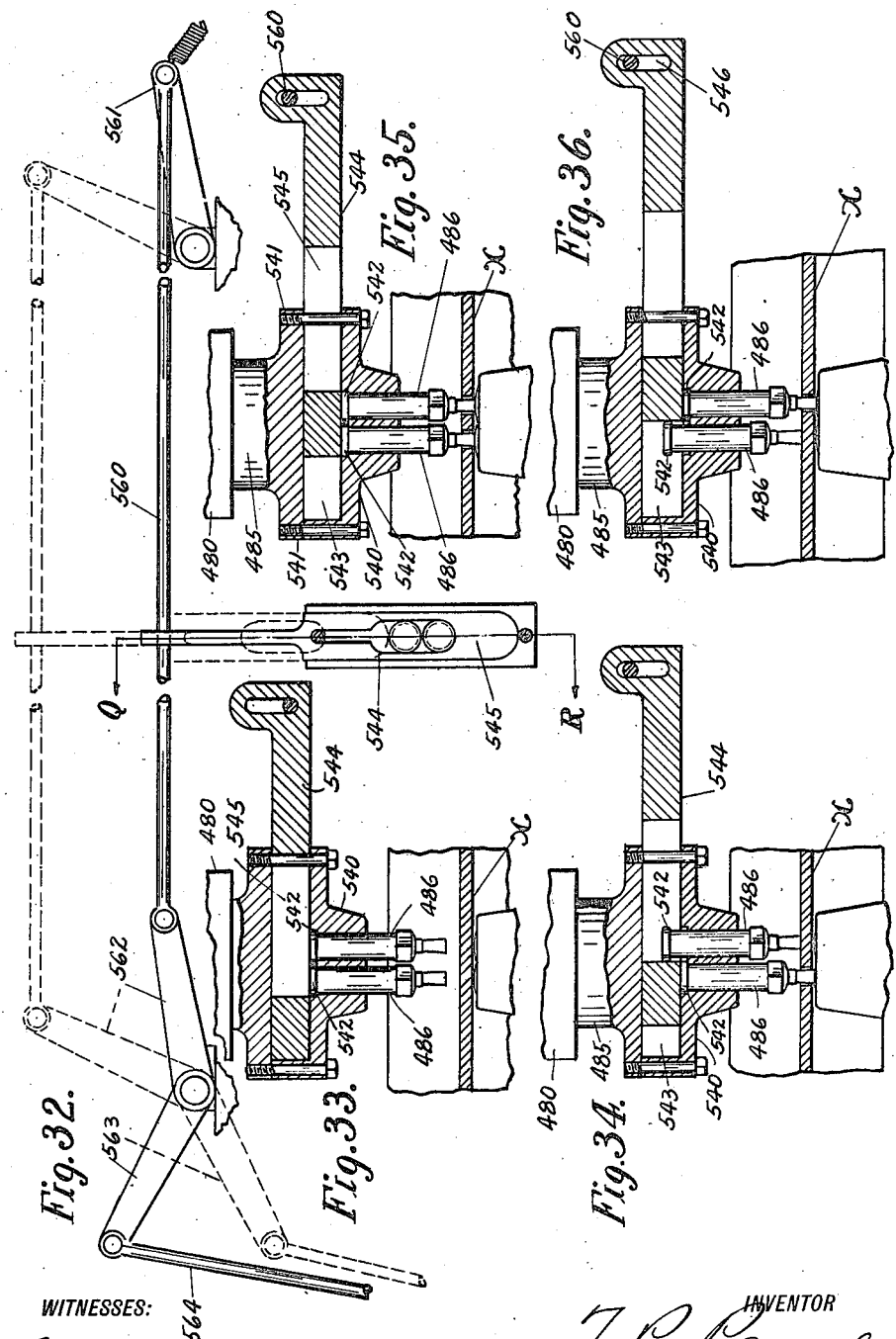

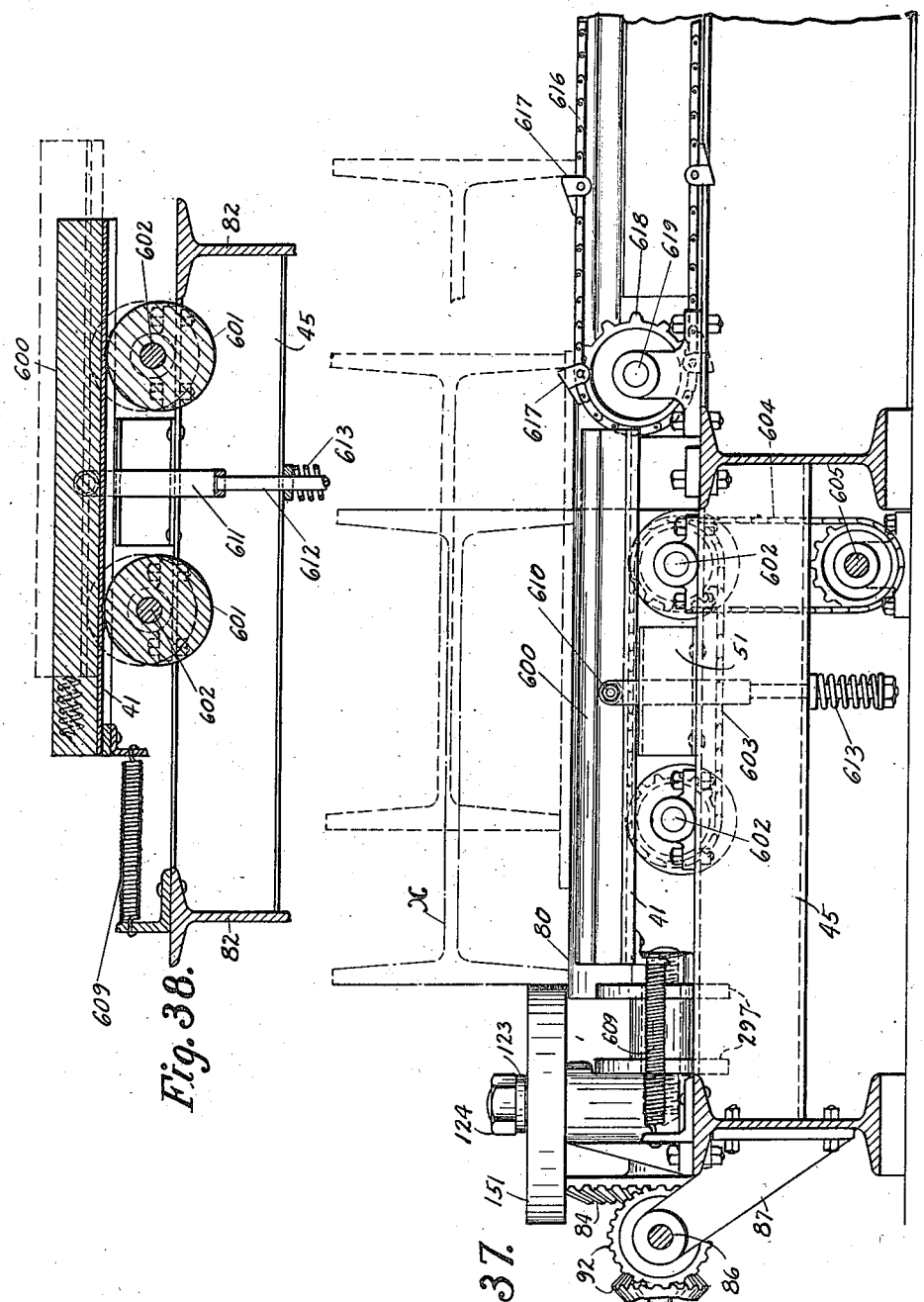

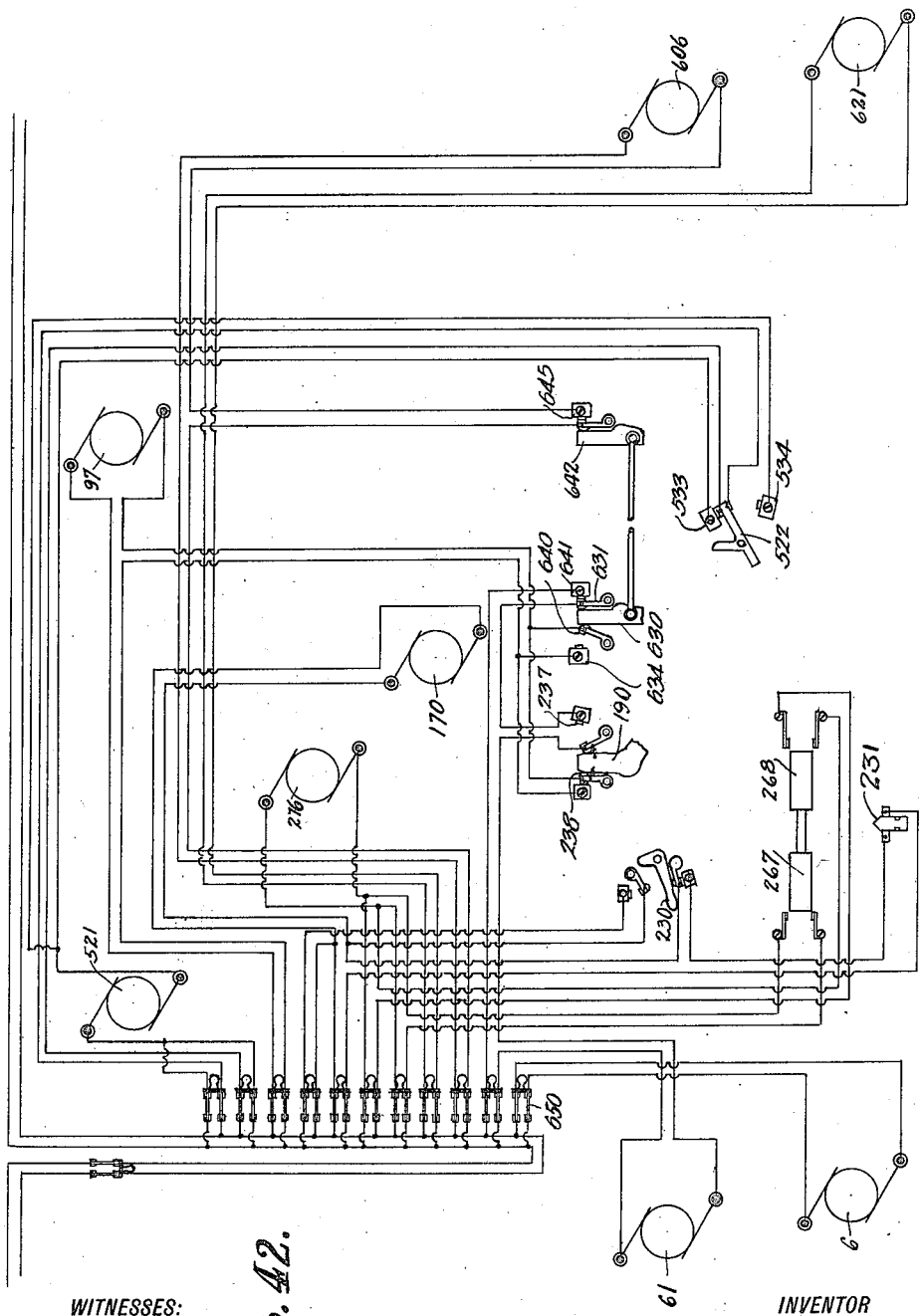

UNITED STATES PATENT OFFICE.

THEODORE P. PAYNE, OF NEWARK, NEW JERSEY, ASSIGNOR TO STEEL UTILITIES, INCORPORATED, A CORPORATION OF NEW YORK.

METAL-WORKING MACHINE.

1,241,247. Specification of Letters Patent. Patented Sept. 25, 1917.

Application filed September 16, 1913. Serial No. 790,085.

*To all whom it may concern:*

Be it known that I, THEODORE P. PAYNE, a citizen of the United States, residing at Newark, in the county of Essex and State of New Jersey, have invented new and useful Improvements in Metal-Working Machines, of which the following is a specification.

The invention relates to machines for perforating structural shapes for fabricating. Objects of the invention are to rapidly and automatically locate and make the perforations in the shapes to provide for successively feeding or traveling the shapes widely varying distances, and stopping them with great precision whether the feed has been a minute distance or one of great length, and to do this expeditiously and accurately even with large and heavy shapes, and to provide novel instrumentalities for effecting the foregoing; to provide for continuous operation by the machine upon one shape after another; to provide for taking successively beams varying greatly in sizes and proportions and operating thereon without stoppage or manual readjustment of the mechanisms; to provide for automatic taking and perforating of successive shapes irrespective of variations in size; to provide for simultaneous perforating of the different parts of a beam or other shape on one progression thereof through the machine; to provide for automatic positioning of the tools relatively to the particular sized shape which is next to be operated upon; to provide for automatic measuring of the successive shapes; to provide suitable means, checks and safe-guards for the proper sequential operation of the various combined elements and parts of the machine; to provide for the maintenance of an adequate supply of shapes, and to provide for a reserve supply and for irregularities and variances between the replenishment of the supply and the taking therefrom of shapes by the machine; to provide novel means for removing the perforated shapes from the machine; to provide for the control of the entire machine from a central point or station by a single operator; to provide in coöperation with the other instrumentalities, settable distance determining devices and to provide for operating same from such central station; to provide a machine especially capable of handling and perforating heavy and large structural work and placing the perforations therein with exactitude, and also to do so with rapidity as well as to provide for so operating upon the heavy and large pieces as they come successively varying in weights and dimensions, and completing the perforating of such shapes at one running through the machine; and to provide in connection with all these various enumerated objects and services novel means and instrumentalities for effecting same. These and other objects of invention will in part be obvious and will in part be set forth hereinafter.

The invention consists in novel parts, instrumentalities, means, combinations and improvements herein shown and described.

The accompanying drawings referred to herein and forming a part hereof, illustrate a machine embodying by way of example, the principles of the invention.

Of the drawings:

Figures 1, 2, 3 and 4, constitute together a plan view of a machine embodying the invention; Figs. 1, 2 and 3 being arranged together from left to right, and Fig. 4 being arranged partly above Figs. 1 and 2. Duplicated parts at the ends of the machine are omitted for the sake of clearness, as are also certain other parts which are shown in their proper relation in other figures.

Figs. 5, 6 and 7 are a combined elevation, corresponding to Figs. 1, 2 and 3, and looking at said figures from the bottom;

Fig. 5ª is a detail of the dials of beam measuring device;

Fig. 9 is a transverse elevation on line A—B of Fig. 1;

Fig. 10 is a fragmentary sectional elevation on line E—F of Fig. 9 looking to the left;

Fig. 11 is a fragmentary elevation looking at Fig. 10 from the right;

Fig. 12 is a transverse sectional elevation on line G—H of Fig. 9 looking to the left;

Fig. 13 is a fragmentary elevation looking at Fig. 12 from the right;

Fig. 14 is an enlarged fragmentary elevation corresponding to the left hand end of Fig. 9;

Fig. 15 is a fragmentary elevation corresponding to the upper left hand corner of Fig. 14;

Fig. 16 is a fragmentary sectional elevation on line G—H of Fig. 14;

Fig. 17 is a fragmentary sectional elevation on line I—J of Fig. 14;

Fig. 18 is a fragmentary elevation, partly in section with the central part broken away, of the connection between the control shaft and the rack connected to the spacing head (said parts being shown on a smaller scale to the right of the center in Fig. 5);

Fig. 19 is an enlarged fragmentary plan view, with the central part broken away, of spacing device for movable flange punch and connections (shown on smaller scale at right hand end of Fig. 1 and at the central part of Fig. 2);

Fig. 20 is a fragmentary detail elevation of the lower left hand end of Fig. 19, the circuit wiring of Fig. 19 being shown connected up thereto for the sake of clearness;

Fig. 21 is a fragmentary elevation corresponding to the lower part of Fig. 19, and shows a beam in position;

Fig. 22 is a fragmentary sectional elevational on line N—M of Fig. 19, showing the roller in lowered position;

Figure 2:
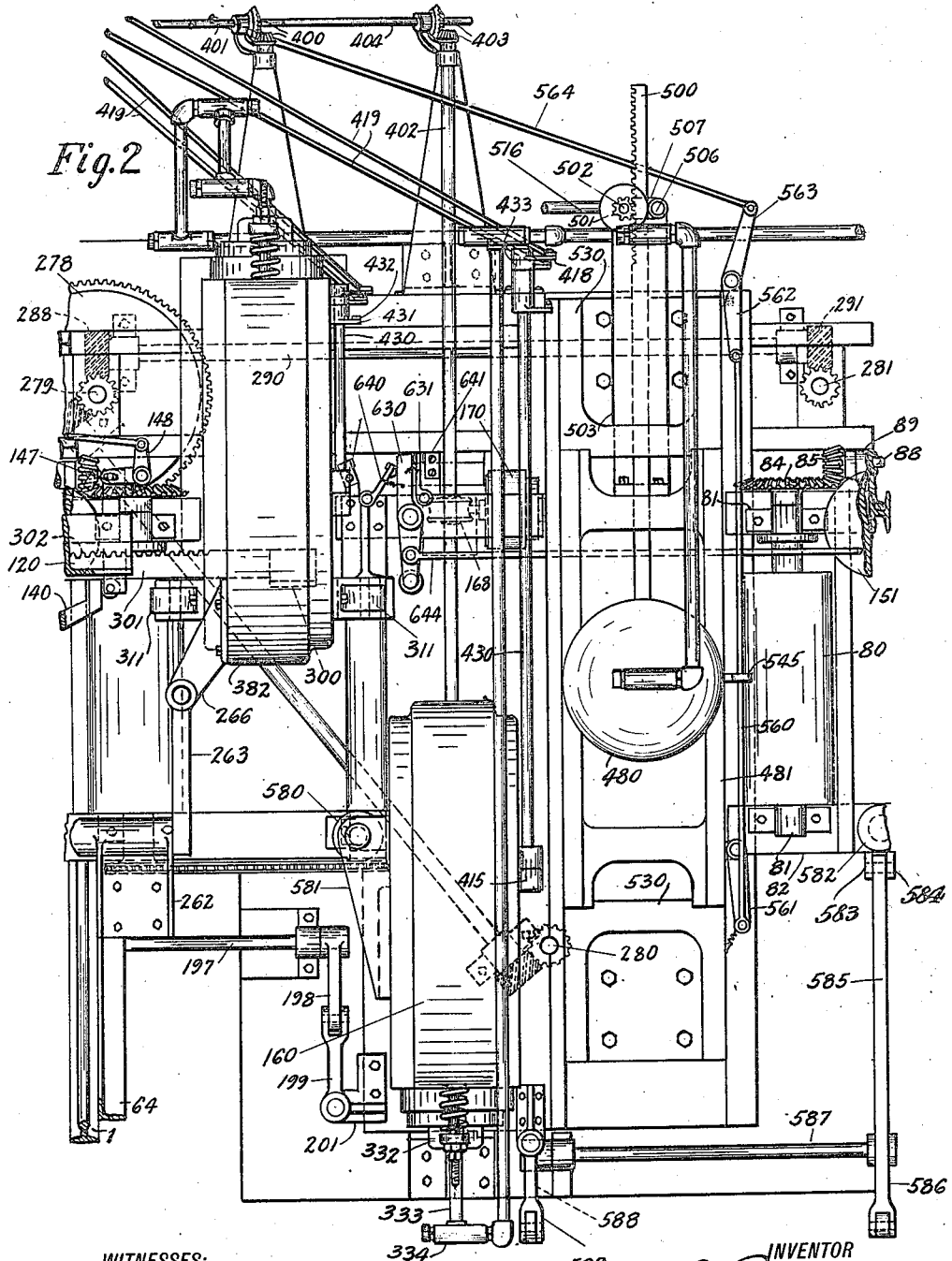
Figure 3:
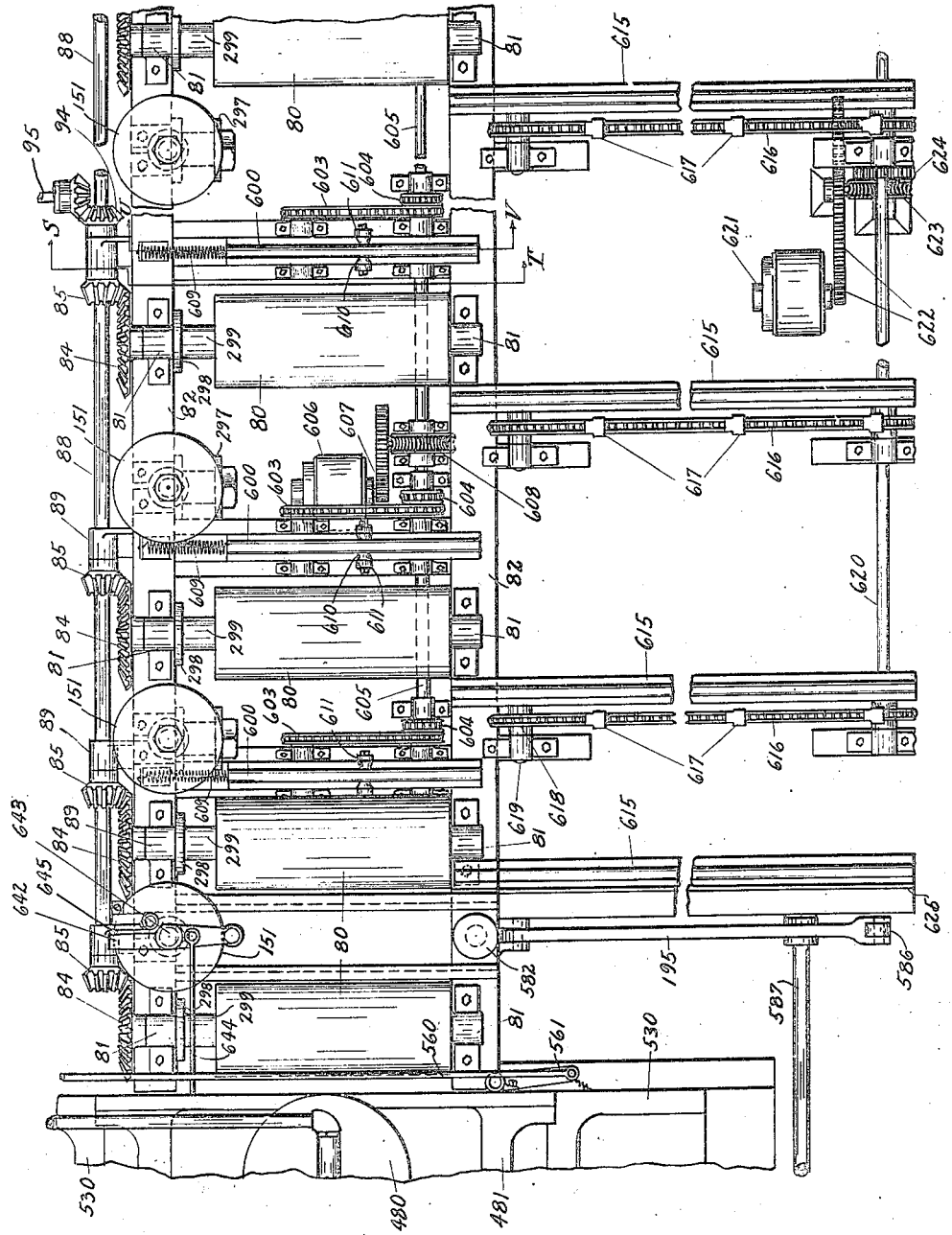
Figure 4:
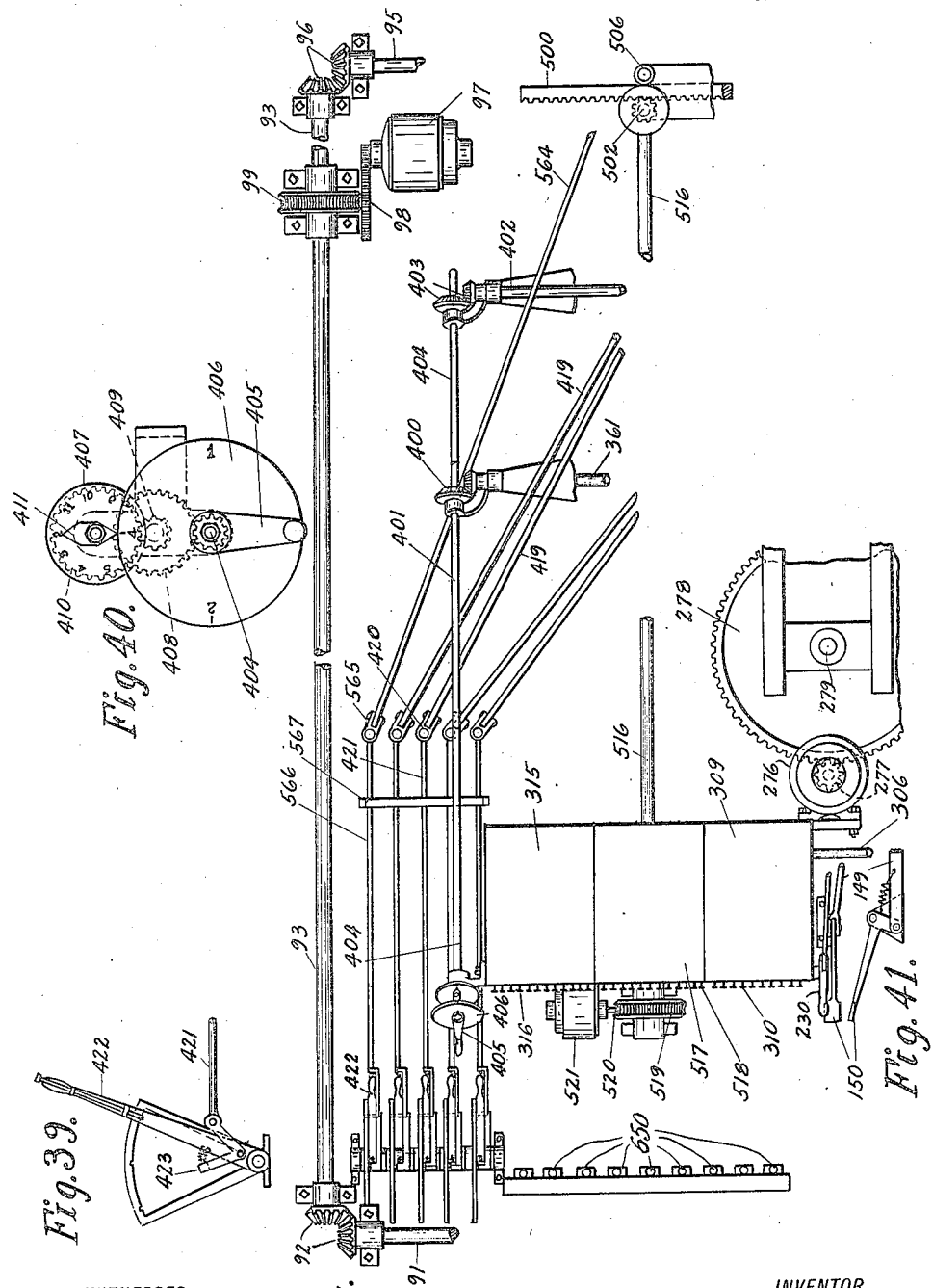
Figure 5:
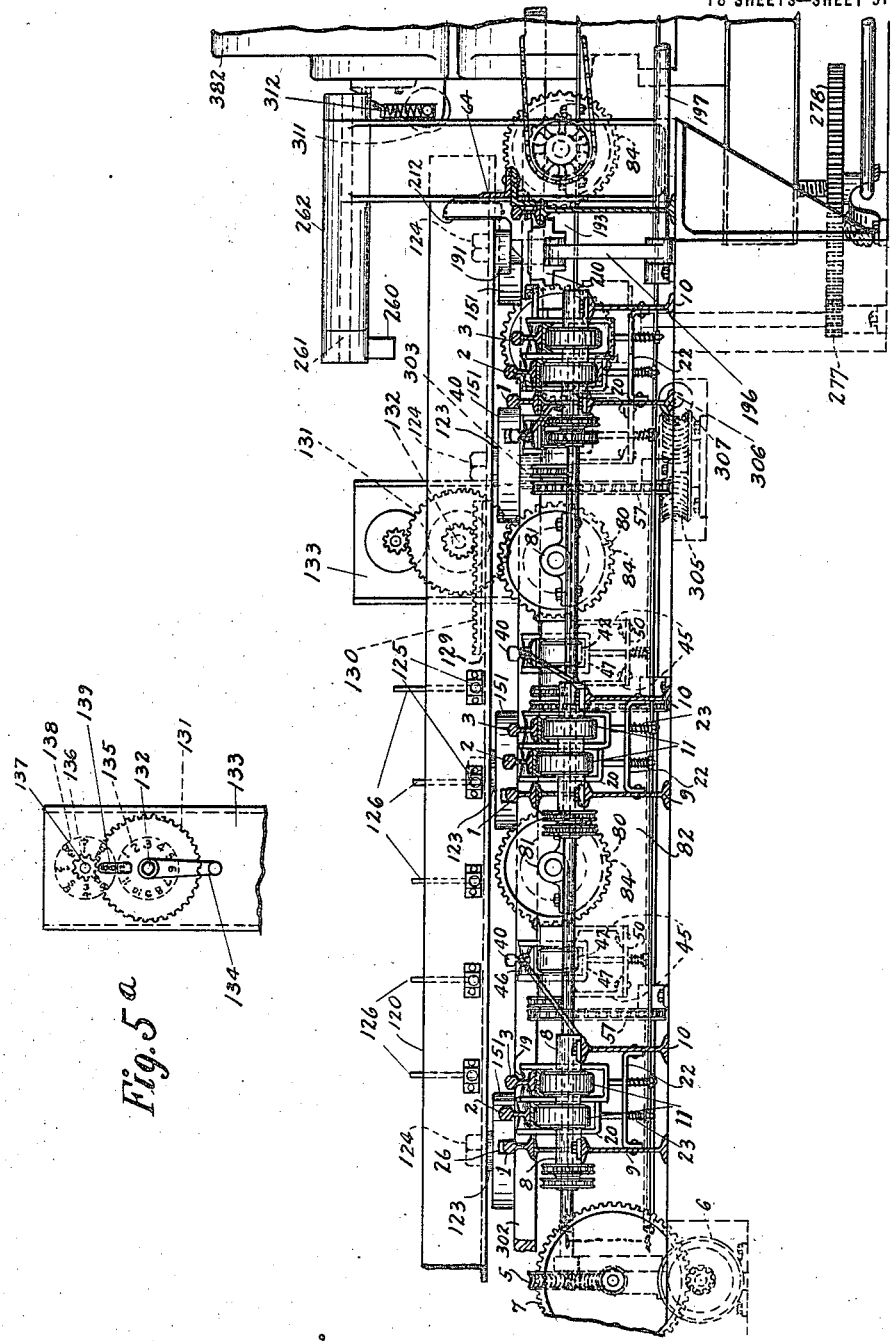
Figure 8:
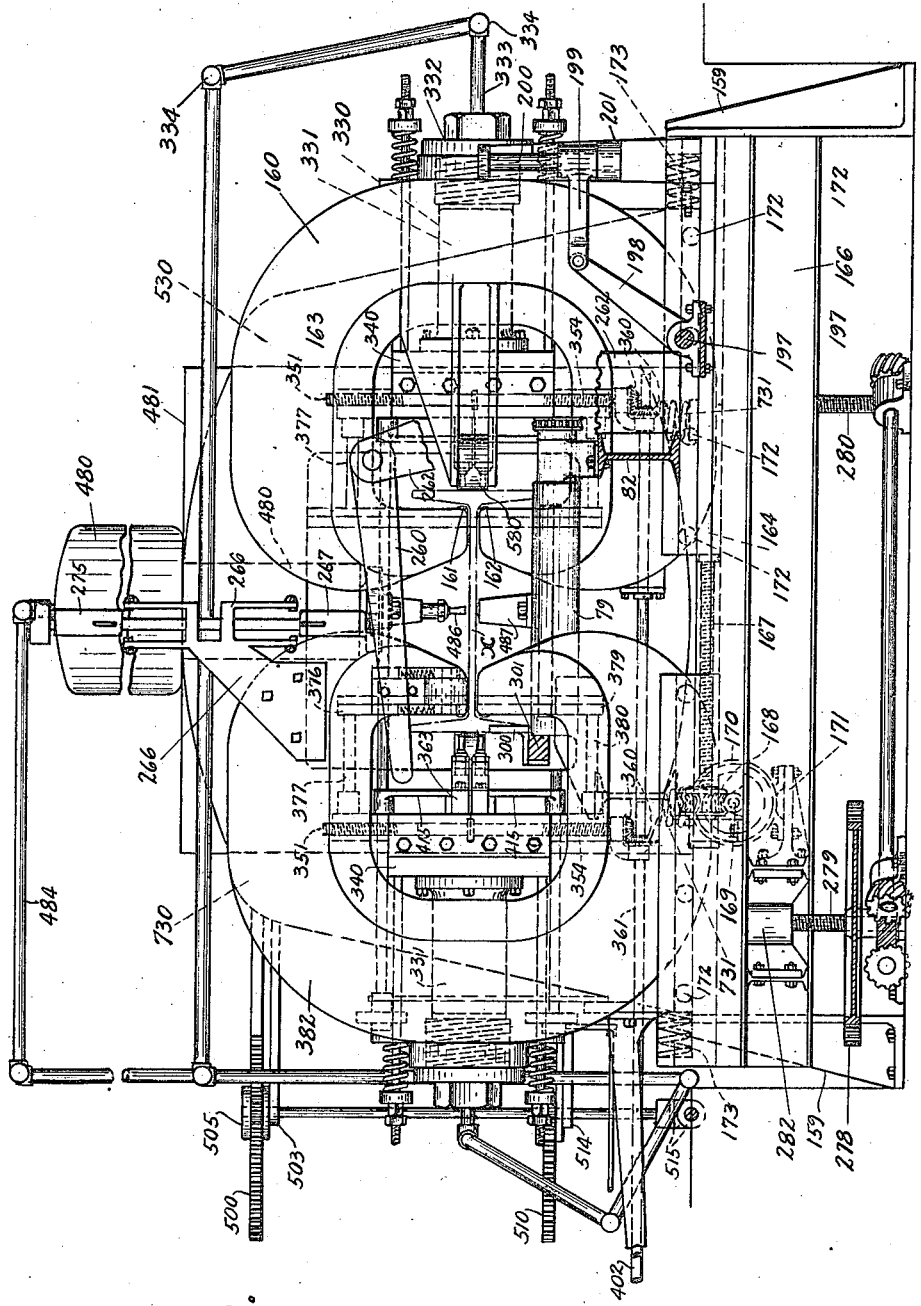
Fig. 8 is a transverse elevation taken on line C—D of Fig. 2 looking to the right.

Fig. 23 corresponds to Fig. 22, but showing the roller raised;

Fig. 24 is an enlarged section on line O—P of Fig. 19;

Fig. 25 is a fragmentary elevation of the devices for positioning the punch relatively to the beam (shown also in Fig. 8);

Fig. 26 is an enlarged view of the upper portion of Fig. 25;

Fig. 27 is a central vertical, transverse section of the flange punch spacing and operating devices;

Fig. 28 is a horizontal section taken just above the center of Fig. 27;

Fig. 29 is a view corresponding to Fig. 28 of a somewhat different form, of punch spacing and operating devices;

Fig. 30 is a horizontal section on Fig. 29 taken just above the center;

Fig. 31 is a fragmentary elevation, with parts in section, of the devices for positioning the web punches (shown also in Fig. 8);

Fig. 32 is a fragmentary plan of the gag operating devices for the web punches (shown also in Fig. 2);

Fig. 33 is a central section on line Q—R of Fig. 32 showing one position of the gag relatively to the punches;

Fig. 34 is a similar view to Fig. 33 with the gag in a different position;

Figs. 35 and 36 are similar to Figs. 33 and 34 but showing the gags in different positions, respectively;

Fig. 37 is a sectional elevation on line S—T of Fig. 3, showing the beam discharging mechanism;

Fig. 38 is a fragmentary sectional elevation on line U—V of Fig. 3;

Fig. 39 is a fragmentary elevation of one of the gag operating levers, shown in plan in upper left-hand part of Fig. 4;

Fig. 40 is a front elevation of the control for positioning the flange punches;

Fig. 41 is a plan of the foot release for the beam progressing mechanism (shown in plan in the contiguous bottom part of Fig. 4); and Fig. 42 is a diagrammatic view of the wiring.

The machine of the present invention is adapted to operate upon beams of widely different dimensions, both as to their length and as to their other dimensions, and in accordance with certain features of the invention the machine adapts or automatically adjusts itself to the various sizes of beams and operates upon them to punch the beams accurately in accordance with the desired indications or dimensions.

In certain of its aspects, the invention provides for feeding up or rendering available a relatively large number of beams or structural shapes, so that they may be brought to a convenient point of supply and there may constitute a reserve supply on hand so that the machine will be able to take a new beam or shape as soon as a preceding one is completed, and the machine may thus be continuously in operation irrespective of any interruptions or irregularity in the supply of the shapes. The reserve supply of beams or shapes which is kept by the machine, and one of which may be separated from such supply and be operated upon by the machine as soon as the preceding beam is finished, provides an automatically available reserve supply between the machine and the means for transporting or supplying the beams thereto.

As provided further by the invention, in accordance with certain features thereof, the machine will take successively, and while being run continuously, beams or other shapes of widely different sizes and proportions and operate upon them without any necessity for stopping and readjusting the machine.

Referring to the accompanying drawings, which illustrate by way of example one embodiment of the invention, and referring for the present more particularly to the embodied mechanism for effecting the services just enumerated, together with other services (best shown in Figs. 1, 5, 9 and 14), means are provided for receiving a plurality of beams or shapes of various and different sizes and of indeterminate number, and keeping them available so that they may be taken successively one by one automatically by the mechanism to be progressed, positioned and punched by the machine.

In said illustrated embodiment, there are provided a plurality of stationary supports or rails 1, upon which the beams or shapes may be deposited. Means are provided for keeping the beams or shapes supplied up to a point from which single successive pieces may be taken to be further operated upon by the machine. As embodied, contiguous to the rail or support 1, there are provided a group of traveling or coöperating supports or rails 2 and 3. The supports or rails 2 and 3 are adapted to alternately rise slightly above the level of the rails 1, to then move forward (that is upward, referring to Fig. 1, and to the left, referring to Figs. 9 and 14) then to sink below the level of the rail 1 and to move backward or return preparatory to again rising and moving forward.

The rails 2 and 3 perform these movements in succession, that is, when a rail 2 is up and moving forward the corresponding rail 3 is down and moving backward, thus providing a continuous forward movement for the beams or shapes lying side by side upon the rails or supports 1.

Figure 1:
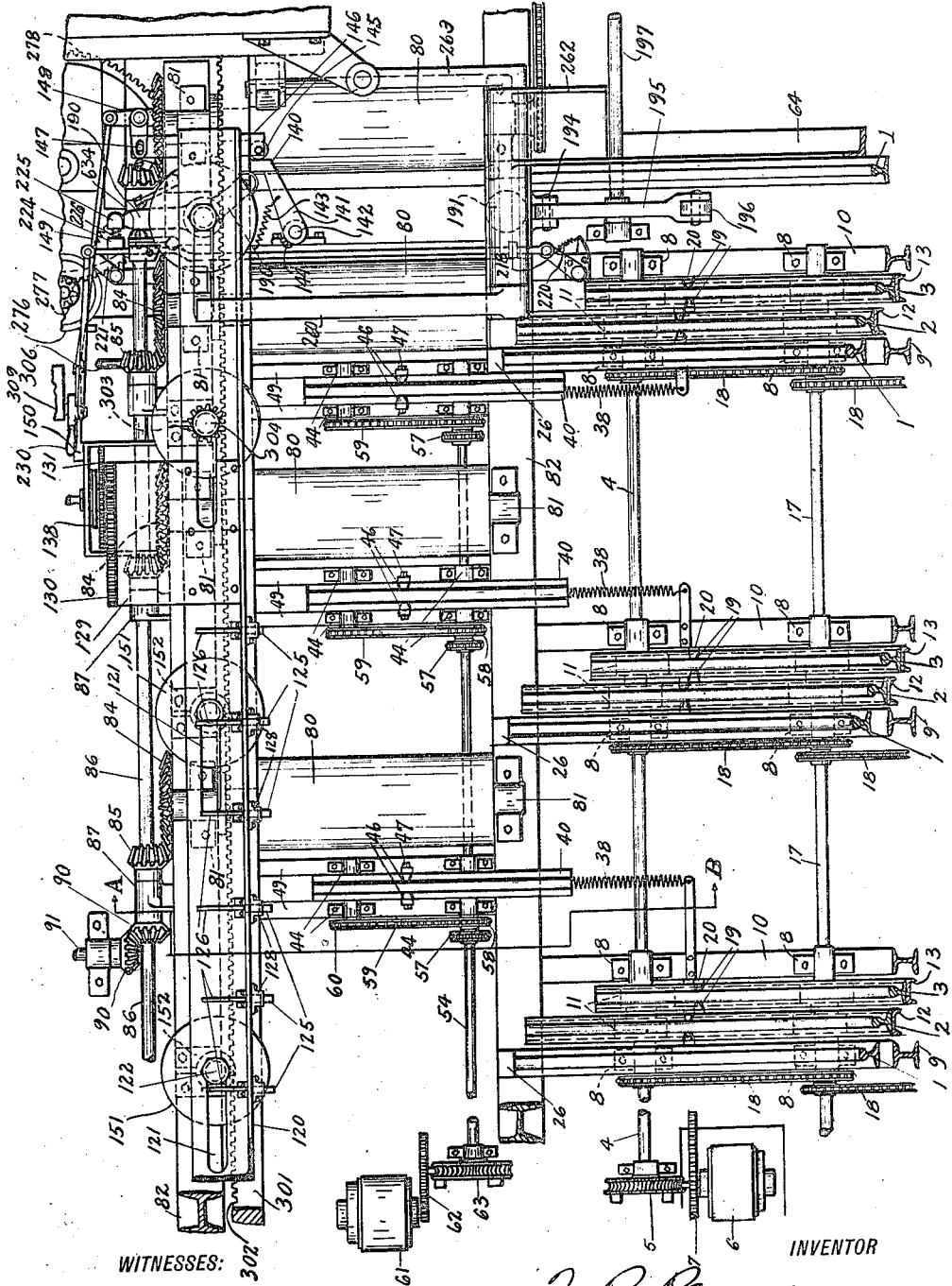

The particular devices for moving and guiding the rails 2 and 3 are best shown in Figs. 1, 5 and 9 to 13. In Fig. 1, a shaft 4 is driven in a suitable manner as by a worm and worm wheel 5, from a suitable source of power, as a motor 6, a reducing gear 7 being also employed, if desired (see Figs. 1 and 5). The shaft 4 is carried in suitable journals or bearings 8, which may be conveniently mounted in the support 9 for the rails 1 and also in a support 10. Said shaft 4 is shown extending to each set or group of the rails 2 and 3 (see particularly Fig. 1).

Fixed on the shaft 4 is a cam or driving device 11, which communicates movement from the shaft 4 to the rails 2 and 3. Said cam device 11 is provided with parts for coöperating with each of said rails comprising annular grooves into which the lower parts of the rails fit. Each of the rails 2 and 3 has upon the bottom part thereof downwardly projecting flanges, numbered 12 and 13, respectively, adapted to fit into corresponding annular grooves in the cam member 11 which grooves are numbered 14, 15 and 16 for the two rails, respectively. The cam member 11 is so shaped that when one of the rails 2 or 3 is up and traveling forward, the other rail is down and traveling backward (as will be best seen from Figs. 10 and 11.)

By means of the flanged lower portion of the rails projecting into the corresponding grooves on the cam member 11, the rails are held firmly in position against lateral strains due to any endwise movement of the supported beams or shapes, or any pressure lengthwise thereof, and tending to tip or laterally displace the rails, and are otherwise kept in position and alinement.

A plurality of moving and supporting mechanisms for the various sets of rails 2 and 3 are provided at different points along the length thereof, as may be found convenient and desirable. In the embodied form, a series of shafts 17, each carrying cam members 11 are provided, which may be driven from the shaft 4 by the sprockets and sprocket chains 18, or in other suitable or convenient manner (see Figs. 1 and 9).

Means are provided in the present embodiment for holding the rails 2 and 3 to the cam member 11 comprising pairs of tapered rolls 19 engaging the rails or supports 2 and 3, respectively, on either side thereof, (see especially Figs. 1, 5, 9, 12 and 13). Said pairs of rolls 19 are carried in frames 20, slidably mounted in apertures 21, in a plate 22 fixed to the frame members 9 and 10. The members 20 are kept under resilient pressure by suitable means, such as springs 23 operating between the corresponding support 22 and a nut 24. The members 20 are kept in alinement by suitable devices such as rollers 25 located on either side thereof. Means are also provided for returning the rails 2 and 3 backwardly or to the left (as referred to in Figs. 1 and 9) when in the lowered or depressed position. In the embodied form of such means weights 26 are utilized, connecting by cords 27 to the rails 2 and 3, which cords may run over pulleys 28.

The upper rolls 25 also serve to ease the rails 2 and 3 off the cams during the backward movement of the rail, so that the flanges 12 and 13 run backwardly on the rollers 25. This position of the parts is best shown in connection with the rail 3 in Fig. 12.

The forward progression of the beams or shapes by the supplying mechanism which has just been described is limited by suitable stops 26 at the forward end of the rails or supports 1.

From all the foregoing, it will be understood that with the mechanism just described, the beams or shapes may be laid lengthwise across the supports or rails 1 by any supplying agency, and at various times, and in various numbers as may be found convenient. These beams will then be gradually fed forward by the rails 2 and 3. The rails 2 and 3, acting in succession, will lift the beams slightly from the rails 1 and carry them forward and maintain the beams side by side at the forward or supply end, with the first beam always available to be taken in and fed forward by the machine, thus regulating any variation between the supply on the one hand and of use by the machine on the other. The mechanism is also adapted, as will be clear, to allow the beams to rest side by side in indefinite numbers, and for indefinite periods, irrespective of whether they are taken rapidly or slowly by the machine.

The rails or supports 2 and 3 also are kept in position and alinement, and are free to return without friction or unnecessary loss of power through working in opposition to the cam member 11.

Means are provided by the invention for taking a single beam or other structural shape from the supply upon the supports 1 and feeding it to the forwarding means which feed or progress it to the tool equipped means to be operated upon thereby. In accordance with certain features of the invention, said means are adapted to take the forward beam and move it at a more rapid rate than the beam upon the supplying means, thus separating it therefrom, and thereby insuring that only one beam shall be fed at a time to the forwarding means. The embodied form of means for separating a single beam and feeding it into the machine comprises a series of supports or rails 40 (see especially Figs. 1, 5, 9 and 14). The rails or supports 40 have a rising and falling motion sufficient to lift the foremost beam over the stop 26 and carry it above the work forwarding rolls 80, or other work forwarding means, and to deposit it thereon, and to return clear thereof. As embodied, the rails 40 (Figs. 14, 16 and 17) are provided with downwardly extending flanges 41 adapted to fit over properly shaped cams 42 so as to roll therealong but to be held against either tipping or against lateral thrust. The cams 42 are shown fixed upon shafts 43 supported in suitable journals 44 mounted upon supporting frames 45.

The rails 40 are provided with stops 39 adapted to engage the beam and prevent its slipping rearwardly. They are also provided with suitable retracting means such as springs 38.

Suitable means are provided for holding the rails 40 to the cams 42, and as embodied such means comprise pairs of tapered rolls 46 engaging the rails 40 at either side (Figs. 1, and 17). Said pairs of rolls are mounted upon bifurcated supports 47, the frames 20 being so formed for this purpose, having respectively stems 48, reciprocable in apertures 49 in a frame piece 50. The parts 40 also work in guiding recesses in the frame member 51. The stems 48 are acted upon by suitable springs 52 shown in compression between the frame member 50 and a nut 53 upon the stem 48.

The shafts 43 are driven in a suitable manner as by a shaft 54 having a series of sprocket wheels 55 thereon. Each sprocket wheel 55 drives a sprocket wheel 56, fixed to one of the shafts 43, by means of a sprocket chain 57. A sprocket wheel 58, fixed to the corresponding shaft 43, carries the sprocket chain 59, passing over a sprocket wheel 60, fixed upon the other shaft 43, under the same rail 40, thus providing a drive for each of the cams 42. The shaft 54 is driven from a suitable source of power such as a motor, 61, having suitable driving connections (see Fig. 1), such as the reducing gears 62, and a worm and worm wheel 63, fixed upon the shaft 54.

A suitable gage or guide, such as the angle plate 64 is provided whereby the adjacent ends of the beams as deposited upon the support 1 may be properly alined for feeding in to the machine.

Work progressing means for forwarding a beam and positioning it relative to the perforating means are provided by the invention, in certain of its aspects, wherein instrumentalities are provided tending to continuously progress the work, said instrumentalities being controlled by settable spacing devices, which devices permit and prevent the progress of the work, as may be called for to properly position the work and bring it to rest with respect to the perforating means.

According to certain features of the invention work progressing instrumentalities are provided which frictionally progress the beam, whereby it is kept in contact with a head, which head is in definite relation to the space determining means, and having its periods and extent of motion definitely controlled by the settable space-determining devices. In the embodied form there is included a series of driven rotatable rolls 80 (Figs. 1, 3, 5, 6, 7, 9 and 14) upon which the beam rests, and by which it is progressed, but the rolls may slip beneath the beam when it is held against their action by the space-determining devices. Said rollers, are arranged in a horizontal series through the machine, the head traveling therealong, and the distance determining means governing the travel of said head through the settable means, comprising preferably a keyboard set by the operator from his station.

The rolls 80 are mounted on shafts 83 journaled in suitable bearings 81 carried on the main frame 82 of the machine. The shafts 83 of the rollers 80 have fixed to one end a beveled gear 84, meshing with a corresponding beveled gear 85 on a shaft 86 at one end of the machine. The shaft 86 is carried in suitable bearings 87. The other gears 85 are carried by a corresponding shaft 88 at the other end of the machine, likewise carried in suitable bearings 89. Suitable driving means for shafts 86 and 88 are provided, and as embodied comprise a pair of intermeshing beveled gears 90 fixed on the shaft 86 and upon a shaft 91. The shaft 91 connects at the other end thereof by a pair of intermeshing bevel gears 92 with the shaft 93 (see especially Figs. 1, 3 and 4). The shaft 88 connects by a pair of intermeshing bevel gears 94 with a shaft 95. Said shaft 95, at the other end thereof, connects by a pair of intermeshing bevel gears 96 to the shaft 93. Suitable driving means are provided, such as a motor 97, having suitable driving connections as a gear 98 and a worm and worm wheel 99. A small forwarding roll 79 is shown between the two flange punch frames 160 and 382, and provision is made for driving it at the same surface or peripheral speed as the rolls 80. For this purpose it is connected by a sprocket drive 78 with the shaft of one of the rolls 80 (see Fig. 6).

Means are provided for measuring each beam as it is fed into the machine. In the embodied form of such measuring means, there is provided a longitudinally arranged slidable member 120, shown in the form of an angled plate, having one part sliding on its support and the other projecting upwardly. Said member 120 has slots 121 therein, through which slots project stub shafts 122. The plate 120 preferably rests upon washers 123 and is held in position by nuts 124 threaded upon the heads of the stub shafts 122.

In the plate 120 are mounted a plurality of spring pressed pins 125, projecting from said plate, and disposed or located at predetermined equal distances corresponding to some unit of measurement, as for instance, they may be located one foot apart. Each of these spring pressed pins or members 125 is preferably provided with a further indicating device to assist in distant reading, such as a movable disk 126 (Fig. 14) shown pivoted at 127 upon the upwardly projected part of plate 120, and having an arm 128 in operative relation with the end of the corresponding pin 125. Thus when the pin 125 is moved inwardly with respect to plate 120 by the beam $x$, the disk 126 is thrown upwardly to the dotted line position shown in Fig. 14. These disks may be numbered so that a person located a distance away at the keyboard or other controlling mechanism may be able to read the disk readily and get the length of the beam in feet or other denominations.

The measuring device provides further for indicating a smaller denomination or submultiples of the denomination indicated by the members 125, to get the exact length of any beam, and for this purpose, as embodied, the plate 120 has fixed thereto an outwardly extending projection 129 (Figs. 1 and 5) provided upon the outer edge with a toothed rack 130. Meshing with said rack 130 is a pinion 131, fixed on a shaft 132, which shaft is supported in a suitable standard or plate 133. The shaft 132 is rotated by suitable means, as a handle or crank 134, and is provided with a dial 135. Meshing with the gear 131 is a pinion 136 carried on a shaft 137. Fixed on the shaft 137 is a dial 138. The pinion 136 is in a size relation to the pinion 131 corresponding to sub-multiples or fraction of the denomination or measurements indicated by the dial 135. A slot 139 may conveniently be arranged in the plate 133 through which the measurement, which may be in inches and fractions of an inch, may be read.

Means are provided whereby the beam may be brought to proper position for measurement. In accordance with certain features of the invention said means are under the control of the operator, and the beam is retained in such position until the spacing or space controlling devices have been set so as to bring the beam in position with respect to the tool equipped means to be perforated thereby in the selected place. In the embodied form of such means, a stop 140 is provided against which the end of the beam comes, and is thus positioned at some integral unit distance from the pins 125 (Fig. 1). The stop 140 is mounted on an arm 141, which arm is pivoted at 142. The stop 140 is held resiliently in position against a pin and lug 144 by spring 143. Means are provided whereby after the beam has been measured, the stop may be moved out of its path. In the embodied form thereof, stop 140 rests against a roller 145 mounted in a slidable member 146, suitably mounted in the machine frame. The other end of the slide 146 has a pin and slot connection 147 with a bell crank lever 148. A pivoted rod 149 connects from said bell crank 148 to a suitable foot or hand lever 150 (Figs. 1, 4, and 41). This is preferably located so as to be actuable by the operator at the key board.

Suitable alining devices are provided for insuring correct position of the beam transversely, and insuring correct lineal feed or progression thereof through the machine, and for positioning it transversely with respect to the perforating tools. In accordance with one feature of the invention, also, this is used as an instrumentality for measuring the transverse travel of some of the punches relative to the work under control of the settable distance controlling means. The embodied form thereof comprises a series of horizontally arranged disks 151 mounted upon the stub shafts 122 and running on the face of brackets 152. (See Figs. 1, 14 and 18).

The manner of operation of the mechanisms just described and illustrated is substantially as follows:

The beam supplying devices present the forward beam $x$ with the lower part $y$ (Figs. 9 and 14) of its flange against the stop 26 at the ends of the rails or supports 1, where it remains until at the proper time in the working of the machine, the rails or members 40 start into operation. The members 40 rise upward and lift the flange $y$ clear of the stops 26 and the lug or shoulder 39 carries the beam *x* forward as shown in dotted lines in Fig. 9. The rails 40 are speeded faster than the rails 2 and 3, and thus draw the beam *x* away from the following beam *a*. On a successive movement of the members 40 the other flange *z* (Fig. 9) is lifted over the stop 26, and the beam *x* is deposited upon the rollers 80 and against the alining rolls 151. At the same time the beam pushes such of the pins 125 as are located along its length. The members 40 are then thrown out of operation by suitable means such as a controlling switch for their motor 61. The following beam *a* is brought forward by the action of the rails 2 and 3, and is brought to rest against the stops 26 until another beam is required by the machine.

When the beam is in position upon the forwarding rolls 80 and against the alining rolls 151, the forwarding rolls 80 are started into rotation, and the forward end of the now transversely alined beam is brought against the stop 140 (Fig. 1). The pins 125 and their indicating disks 126 are in a definite relation with the stop 140 and will indicate the length of the beam by the reading of the farthest disk 126 thrown up in the corresponding denomination, except as to any fraction over the integral distance between the pins 125. The operator then turns the handle 134 and moves the plate 120 (to the right, referred to in Fig. 1) until the first projecting stop 125, that is, the first stop which was not pushed in by the beam as it went into position against the alining rolls 151, contacts with the end of the beam. The reading on the dials shown in Fig. 5ª will now give the additional reading in the sub-multiple denomination, such as inches and fractions thereof either by direct or complementary reading. The operator by glancing at the farthest disk 126 and at the dials 135 and 138 can get the beam length without leaving his station at the controls. The operator when he has set the distance-controlling devices so as to again stop the beam at the proper point to be perforated, by actuation of the lever 150, withdraws the roller 145 from behind the stop 140. The stop 140 is then pushed or swung against the action of its spring, and the beam is allowed to pass, the stop 140 swinging back into position after the beam has passed, at which time also the slide 146 will again pass into holding position as shown in Fig. 1.

The invention in certain of its aspects, provides for perforating or punching the various parts of the beams, such as the web and flanges of an I-beam, on one progression of the beam through the machine. The invention further provides, in accordance with certain of its features, for a plurality of different and separately movable tool equipped means, each adapted to operate upon corresponding parts of the beam, such as one set of punches or like tools for the web, and another set of punches or like tools for a flange or a set for each flange.

In accordance with one feature of the invention, one set of tool equipped means is movable to accommodate beams, and other structural shapes of different sizes, and in the embodied form, and illustrated in connection with an I-beam, one of the flange punching mechanisms is automatically adjustable horizontally to accommodate beams of different depths, said tool equipped or punching mechanism being automatically adjustable by the positioning means and in accordance with the size thereof. In certain aspects of the invention, it provides for effecting these services, conjointly or otherwise, under settable or selective control by the operator through the distance determining devices.

In the embodied form (Figs. 8 and 27), the flange punches are mounted in a frame 160, which is adapted to receive the web through the opening between the frame ends (shown at the left in Fig. 8), the flange of the beam traveling longitudinally within the space formed internally of said frame. The dies are shown at 161 and 162 and the punch or punches at 163. A particular form of these will be described more in detail at a later point.

Figure 6:
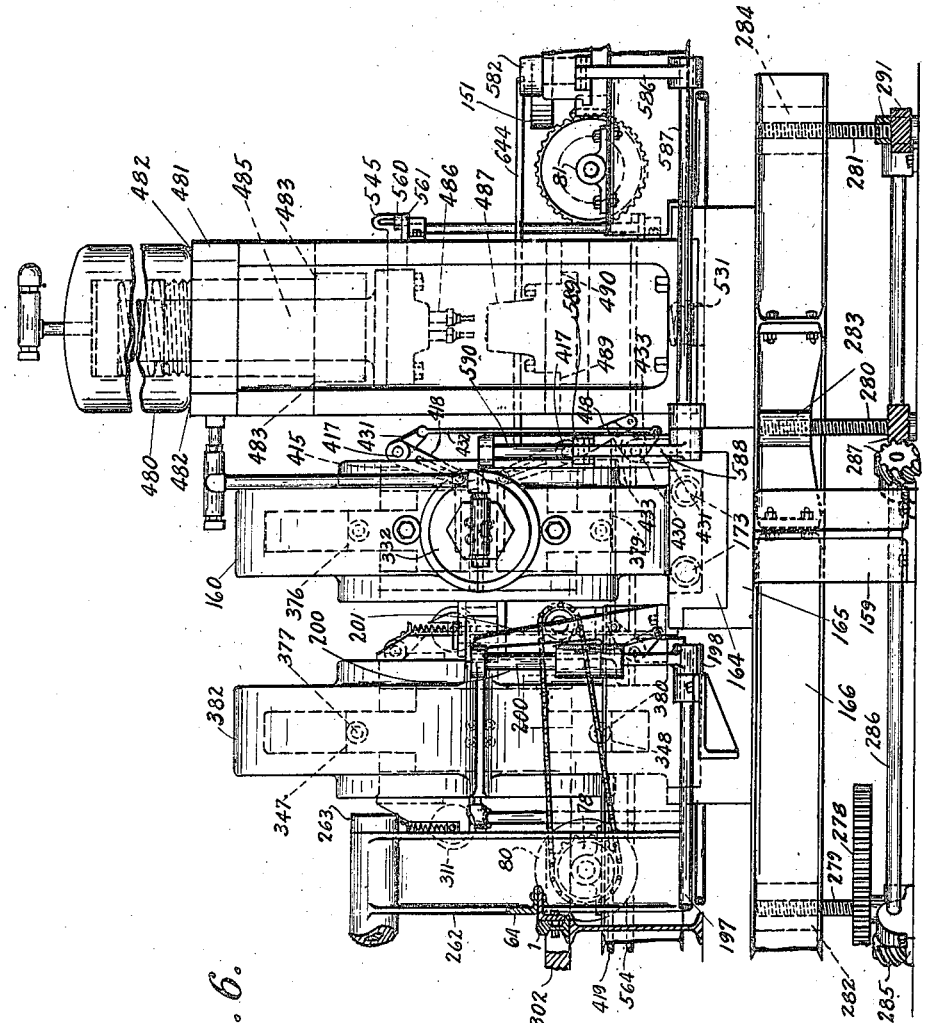

The frame 160, and the corresponding frame for the other flange of the beam are set off or staggered with relation to each other in order to give more space for construction and strengthening of parts, and for accessibility to and proper clearance therebetween (see Figs. 2, 6 and 8).

As embodied frame 160 is shown movable or adjustable horizontally (referred to in Fig. 8) to take beams of different size and depth when positioned against the alining rolls 151. The frame 160 is mounted on a base 164, which base is slidable to and fro in the guide piece 165, said guide piece being mounted on the frame 166. The base 164 has attached thereto (at the left hand side, referring to Fig. 8) a threaded rod 167, which rod engages an internal thread in the worm wheel 168. The worm wheel 168 engages a worm 169. The worm 169 is driven in a suitable manner, as by a motor 170, shown mounted on a bracket 171, carried on the frame 166.

The frame 166 is guided and alined in its vertical movement by suitable means such as the guides 159. (See Figs. 6 and 8).

Means are provided for automatically compensating for differences in thickness of the metal in the various beams and for bringing the dies firmly against the material of the flange in opposition to the punch irrespective of such differences in thickness of the material. In the embodied form of such means, and as applied to web punches, the frame 160 is adapted to move on rollers 172 mounted between the frame 160 and the base 164. Springs 173 tend to keep the frame 160 in fixed position upon the base 164. It will be understood that if a hydraulic punch be used, after the punches contact with the beam flange, the fluid in the cylinder, which cylinder is mounted on the frame 160, would tend to move or draw the frame 160 backward a very little against the action of the spring 173 so as to bring the dies 161 and 162 firmly against the flange, and thereafter the force of the actuating fluid would drive the punches through the flange against the firmly held dies. The various plungers may be restored by suitable springs, if desired, and such springs are shown herein and indicated by reference numeral 158.

In accordance with one feature of the invention, means are provided whereby the fed-in beam automatically positions the frame 160 with respect to the beam. As embodied, said means comprises circuit controlling devices for the motor 170 (which moves said frame), said controlling devices coöperating with the beam or shape. When a beam is fed into the machine, upon the feeding rolls 80 and against alining rolls 151, it contacts with a movable switch controlling member 190, which controls the circuit which supplies the motor or other drive for feed rolls 80, and also the motor or drive for the feeding in rails 40 (see Figs. 1, 2, 5, 8 and 19 to 24). A suitable gage shown as a roller 191 is provided mounted upon a sliding member 192, sliding in suitable guides 193 mounted in the frame. Connected to said slide 192 by a suitable pivot joint 194 is a link 195, having its other end pivoted to an arm 196. Said arm 196 is fixed to a shaft 197, suitably carried on the machine frame. Fixed also to said shaft 197 is an arm 198, which arm is pivotally connected to a member 199, said member being slidable on a rod 200. The rod 200 is carried by bracket 201, which bracket is fixed upon the slidable base 164 of the frame 160 and moves to and fro therewith. It will be seen that the gage member 191 and the frame 160 will travel together or in harmony with each other inwardly and outwardly, that is to the right and left, referring to Fig. 8.

The gaging member 191 is shown in the form of a roller freely rotatable in the slide 192, and the roller 191 is also movable up and down in the slide 192 to permit the beam or shape to pass, as will be later described, and for this purpose the roller 191 is provided with a stem 214 resting in an aperture in slide 192.

Mounted in suitable guides 210 on the face of the slide 192 is a member 211, preferably carrying a contact member, such as roller 212. Said member 211 is provided with a camming face 213 adapted to enter beneath the roller 191 to move it up and down in the slide 192. (Figs. 22 and 23). The slidable member 211 has a slot 215 therein through which the stem 214 of the roller 191 passes, thus permitting the sliding of the member in raising and dropping the roll 191.

The sliding member 211 is provided at its end with an apertured lug 216, through which aperture passes a rod 217, said rod being moved transversely with the slide 211 but the slide is free to move longitudinally along the rod (see Fig. 19) without imparting motion to the rod.

The rod 217 is pivotally connected at one end to an arm 218 pivotally carried on a suitable bearing 219. Said arm is acted upon by a spring 220 (impelling it in a clockwise direction: referred to in Fig. 19). Said rod 217 at its opposite end is pivotally connected to an arm 221, fixed on a shaft 222, which shaft is mounted to turn in a suitable bracket 223 carried on the machine frame. Fixed also to said shaft 222 to rotate in harmony with the arm 221 is a locking member 224. The member 224 is adapted to pass the end of the member 190 and to be held in position thereby. For this purpose the member 224 is shown with a plunger 225, which plunger is spring pressed outwardly by a suitable spring 226 and is restrained by a pin and slot connection 227 with the body portion of the member 224. It will be recalled that member 190 is controlled or actuated by the beam passing through the machine.

Pivoted also to the arm 221 is a rod 228 which rod is likewise connected by a universal joint 229 to a lever 230. The lever 230 is shown in plan in Fig. 19, and is shown in elevation in the adjoining Fig. 20, looking at the corresponding part of Fig. 19 from the right. Said lever is shown in full lines in one position and in dotted lines in the other position in said Fig. 20.

Suitable means are also provided for throwing out the feeding in mechanism after the gage 191 comes back to the beam. The embodied form thereof comprises a plunger 231 having a pin and slot connection 232 with the member 211. The spring 233 impels the plunger 231 outwardly, that is to the position indicated by dotted lines in Fig. 24. Suitable terminals and contacts 234 and 235 are connected up to the circuit for the motor which moves frame 160, and a suitably insulated bridge piece 236 makes and breaks the contact between the terminals 234 and 235 and is shown in the circuit breaking or interrupting position in Fig. 24.

Two reversing switches 237 and 238 are shown (Fig. 20) controlled or operated by the lever 230. Suitable cut out switches 239 may also be provided.

The manner of operation of the mechanism described is substantially as follows:

By way of illustration, it may be assumed that a relatively small or shallow beam has been run through the machine, and that a relatively larger or deeper beam, that is, one with the flanges farther apart from each other is about to be run through. It will be clear that, in order that the frame 160 (Fig. 8) may be in suitable position to receive the corresponding flange of the beam between its punches and dies, as the beam is fed forward by the rolls 80, the frame 160 must be moved the correct distance to the right, referred to Fig. 8. The gage 191 is in the depressed position permitting the beam, as fed in by the rails 140, to pass thereover. The gage 191 is in such position by reason of the member 190 (see Figs. 1 and 19) under the action of its spring moving into the dotted line position shown in Fig. 19. This permits the locking member 224 to escape, and under the influence of the spring 220 to pass to the dotted line position shown in Fig. 19. The corresponding movement of the rod 217 slides the member 211 in an upward direction referred to Fig. 19, or to the right, referred to Fig. 22, and substantially to the position shown in Fig. 22. The beam thus passes in, as already described, and is deposited upon the feed rolls 80 and against the alining rolls 151.

When the locking member 224 is permitted by the movement of the member 190 to pass to the dotted line position of Fig. 19, and the lever 220 is thrown into the corresponding dotted line position shown in Fig. 20, the motor 170 in Fig. 19 begins to feed or travel the frame 160 to the right, referred to Fig. 8. This travel of the frame 160, through the member 199, arm 198, shaft 197, arm 196, and link 195, draws the slide 192 to the right, referred to Fig. 21, and in a downward direction, referred to Fig. 1. This causes the gage 191 to travel out from beneath the new beam, and causes the roller 212 to travel along the end of the beam. During this movement the lug 216 travels along the rod 217.

The lever 230 is then pressed downwardly, referred to Fig. 19, or to the right, referred to Fig. 20, when the roller 212 is traveling along the end of the beam, being positioned to contact either with the flange or the web until it reaches the edge of the beam. As the roller 212 passes the edge of the beam, the switch lever 230 will move to the full line position shown in Fig. 20. This movement causes the sliding member 211 to pass from the position shown in Fig. 22 to that shown in Fig. 23, thus lifting the alining roller 191 into operative relation with the flange of the beam, as shown in Figs. 21 and 23, the switch lever 230 then being in the full line position shown in Fig. 20, the roller 212, and the gage 191 are both behind the flange, as shown in Fig. 21, and the lever 230 coöperating with the switch 238 will drive the motor in a direction to feed in the gage roller 191, or toward the left referred to Fig. 21. This inward travel of the gage is stopped when the gage contacts with the flange of the beam $x$.

It will be understood that the lever 230 passing into coöperation with the switch 238 and thus reversing the motor, causes the frame 160 to likewise travel in the opposite direction, or to the left referred to Fig. 8. When the gage roller 191 contacts with the flange, as shown in Fig. 21, the frame 160 has likewise traveled to the position to receive the web and flange of the beam as shown in Fig. 8, and the punches and dies are in position to operate upon the flange. At the same time that member 190 contacts with the beam, the plunger switch 231 is pressed inward, thus breaking the circuit and shutting off the motor 170.

In case a shallower beam follows a deeper beam, the lever 230 when pressed will immediately move from the dotted line to the full line position, (referred to Fig. 20), the gage 191 will immediately rise and begin to move inwardly, and the plunger switch 231 will again throw out the motor 170 at the proper time.

Means are provided, when a series of beams of the same dimension or depth are run through the machine, the cut out switches 239 could be used and the motor 170 being cut out, the frame 160 would then remain in the same position and receive one beam after the other in succession until switches 239 are again thrown in. In the case just referred to, the gage 191 would still perform its function of alining the beam flange with the punches and dies of the frame 160 by reason of the action of the member 190 and of the locking member 225 and of the corresponding movement of the rod 217. These mechanisms and the movements just described raise and lower the gage and alining member 191, as will be clearly understood from what has already been said.

Means are provided by the invention for bringing the various sets of perforating tools into proper position with successive beams, as these vary in height and width. This includes the movement of the perforating tools both vertically and horizontally so that the corresponding part of the beam will be in proper location, that is each flange will pass between its punch and dies, and also the web or other parts of the beam as it is fed forward. The work and the tool equipped means are thus brought into proper relation so that the position of the tools as governed by the indications and settings of the controlling mechanism will be proper to place the perforations in the beam in the actual positions called for by the indications of the settable controlling means. This involves the vertical centering of the various tool equipped means relatively to the work as it is positioned and alined to be forwarded to the tool equipped means. As embodied, means are employed which bring the punch and die carrying frames into proper vertical alinement with the work. In accordance with certain features of the invention, this positioning and alining is automatically effected by the size of the beam which is fed in to be operated upon, that is, mechanism is provided which coöperates with the beam for centering or adjusting the tool equipped means relatively thereto.

In the embodied form of such means, there is provided above the feed rolls 80 an arm 260 fixed to a shaft 261, which shaft is supported on a suitable bracket 262 (see Figs. 2, 6, 8 and 25.) Said arm is in the position shown in dotted lines in Fig. 25 when there is no work in the machine. Fixed to the other end of the shaft 261 is an arm 263 (Figs. 2, 25 and 26). Coöperating with said arm 263 is a sliding switch mechanism 264. The said switch mechanism 264 comprises a rod 265 sliding in a supporting frame 266, which frame is carried upon the general frame for the punch and die mechanisms, which latter rests on the frame or the base or frame 166. Said rod 265 is provided with a contact piece 267 at or near one end thereof, and with a bridge piece 268 at or near the other end thereof. A suitable weight 269 may also be provided to keep the rod 265 resting upon the end of the arm 263. Two contacts and suitable circuit connection 270 and 271, respectively, are provided for the contact piece 267, and two similar contacts and circuit connections 272 and 273, respectively, are provided for the bridge piece 268, said contacts being carried by frame 266. It will be understood that the contact pieces 267 and 268 are insulated from the rod 265. Suitable quick break non-arcing devices such as springs 274 and 275 are provided.

The contacts 270, 271 and the contacts 272 and 273 are in circuit with a suitable motor 276, and the two sets of contacts constitute pole reversing devices to drive the motor 276 in opposite directions (Figs. 1 and 2). The motor 276 has on its shaft a pinion 277 meshing with a gear 278. Said gear 278 is on a vertical shaft 279, provided with a screw thread. Connections are provided from the gear 278 to a plurality of similar shafts preferably two other shafts 280 and 281 (Figs. 2 and 6). As embodied said connections comprise a pair of spiral gears 285 connecting said shaft 279 with horizontal shaft 286. Said shaft 286 connects by a pair of spiral gears 287 with shaft 280, and another spiral gear 288 connects spiral gears 285 on shaft 279 with a horizontal shaft 290. Said shaft connects by a pair of spiral gears 291 with shaft 281. Said threaded shafts 279, 280, and 281 engage with internally threaded bearings 282, 283, 284 which are connected to the base 166, upon which base the frames or supports for all the tool equipped members are mounted.

The manner of operation of the mechanism just described is substantially as follows:

As the beam $x$ is fed in from the right, referred to in Fig. 25, the arm 260 is raised by the flange, or other part, of the beam contacting therewith, and thereby, through the arm 263, slides the rod 265 upwardly. This completes the circuit and starts the motor 276, which through the connections, just described, rotates the threaded shafts 279, 280 and 281 and thus either raises or lowers the base 166 and therewith the punch and die frame 160 and also the other punch and die frames. The switch controlling rod 265 is held in stationary position by the arm 263, and the position of the arm 263 is governed by arm 260, which latter arm rests upon the beam which is in position and alinement upon rolls 80. The frame 266, on which the corresponding contacts are located, moves up or down with the tools, and the construction and arrangement is such that the circuit is broken when the tools and work are centered. The breaking of the circuit stops motor 276. The parts will be maintained in this position automatically so long as the beam is beneath arm 260.

As soon as the punches or tools are centered with respect to the beam the motor 176 is cut out by means of hand switches, and these hand switches are not thrown in again until it is required to center the tool for a new beam. This prevents idle movement of the mechanism when the beam passes under arm 260. Should the new beam be of such a size as to require a depression of the punches or other tools, the switch 264, by reason of the lowering of the arms 260 and 263, would be in such position that the contact 268, will close the circuit between the points 272 and 273. The frame 166 then would be lowered in a corresponding manner, as will be clearly understood from the previous description. It will be recalled that the sliding pin 265 is positioned by the beam, and that the contacts 270—273 move with the support 166 for the punch and die frames, and thus in case of either a larger or smaller beam following, the motor will be driven in the proper direction, and the circuit be broken at the proper time, to properly position the punches and dies with respect to the particular size of beam which has been fed into the machine.

It will thus be understood that the punch or punches, or other tools, which operate upon the web will be properly positioned relatively to the web of the particular beam, whatever the dimensions of the beam may be, and that in accordance with one aspect of the invention this is done automatically by the beam itself. The flange punches are likewise at the same time centered relatively to the corresponding flange. Likewise, by these mechanisms, the openings in the frame 160 and the corresponding frame on the other side (see for instance Fig. 8) are in proper vertical alinement and position, both as regards the web and flange, or other parts, of the I-beam, or other structural shape, as it may be fed thereto. This is clearly illustrated in Fig. 8 with respect to an I-beam.

Suitable distance controlling or determining means are provided by the invention settable by the operator, for controlling the travel of the beam or other structural shape, whereby it is positioned and stopped in its travel longitudinally with respect to the tool equipped means to receive the perforations at the proper places in the beam.

In the embodied form of such means there is provided a member or head adapted to travel along the path of the beam through the machine, said head being maintained in definite relation to the distance determining means and the settable control for the distance determining means. The beam is kept in constant relation with the said head and preferably in contact therewith, thereby securing an absolute progression and stopping of the beam or shape in exact conformity with the settings for the distance determining means, thus properly locating the perforations in the work.

In accordance with other features of the invention the beam is urged forward continuously and this may be done frictionally, and the head is permitted to advance the desired distances, as set on the distance controlling devices, and brought to rest for each setting, thus to locate and then make the successive perforations. The invention in one of its aspects provides also for placing the drive or motive power for the head under a continuous forward impulsion the settable means of the distance determining devices acting to permit or prevent its forward movement to properly space and effect the perforations in the beam.

In the embodied form of such means, a head 300 is provided, against which the forward end of the beam or shape is firmly held, as it passes through the machine in relation with the tool equipped means. The head 300 is fixed on a rack or member 301, which rack is provided with teeth 302, adapted to coöperate with suitable connections to the distance determining and controlling means. As embodied, a pinion 303 meshes with the teeth 302, said pinion being fixed on shaft 304. Fixed to the shaft 304 is a worm wheel 305, meshing with a worm 307 on the shaft 306. The shaft 306 is connected to the settable space or distance determining devices 309, which are provided preferably with a suitable key board 310. In accordance with certain features of the invention, this mechanism may be constructed the same or similarly to my pending application for Patent Serial No. 704,819, (Ren. 31,085) filed June 20, 1912, and the selectively settable devices and keyboard may be in tens of feet, feet, inches and fractions of an inch, as in my said application Ser. No. 704,819.

Suitable guiding and alining means for the rack 301 are provided and as embodied, there is provided on the shaft 81 of the alining rolls 151, a loose sleeve 299 and adjacent thereto a loose washer 298 abutting against the journal cap. The alining rolls 151 extend above the rack 301, and thus accurate alining and guiding means are provided for the rack in its longitudinal progression through the machine, and it is also firmly held to its driving means. Additional alining means may be provided for said rack 301, if desired, and a form of such means is shown (see Fig. 3) where a series of double flange rolls 297 are rotatably mounted upon a corresponding series of studs mounted upon the machine frame. By means of such a mechanism the beam or shape moves strictly in accordance with the movement of the shaft 306, and the movement of the shaft 306 again is in strict accordance with the settings made by the operator. Each new setting made by the operator permits a corresponding amount of rotation of the shaft 306, and this permits through the worm and worm wheel 305, 307, a corresponding movement of the head 300. The feed rolls 80 keep the end of the beam or shape firmly against the head 300, so that it feeds accurately and precisely in accordance with the set distances, stops to be perforated, and then moves along again the prescribed distance of the next setting, and so on.

For the purpose of insuring such a feed of the work, means are provided for preventing any lag or rebound of the beam, and in the embodied form thereof, rolls 311 are provided for pressing upon the work and holding it firmly to the rolls 80. The rolls 311, as embodied, (Figs. 2 and 6) are acted upon by springs 312, which increase the pressure upon the beams, and also cause or permit proper regulation of the pressure to suit beams of different weights and sizes. If desired also suitable devices for checking against backward movement may be used upon the rolls 311, such as a pawl and ratchet, or such checking devices may be used acting directly upon the work itself, or otherwise. If desired, the distance controlling mechanism or settable distance determining devices, may be constructed to allow for the difference in position of the various tool equipped means. That is, a plurality of keyboards may be provided, as for instance, the keyboard 310 for the controlling devices 309 and a keyboard 316 for the controlling devices 315, and the mechanisms may be arranged so that they will compensate for the differences in longitudinal position along the travel of the beam of the various sets of perforating tools, and the desired readings may be taken from the drawing, or other source, and transferred directly to the keyboard by the operator. On the other hand, a single space controlling and determining device may be used for two or more sets of the tool equipped means, and allowance made in the setting for the different positions along the travel of the work of the various sets of tools. This may be a matter of memory and mental calculation by the operator, or he could have a suitable key or transposing table.

Means are provided by the invention for moving and positioning the punches, or like tools, transversely of the beam, so as to locate the perforations at the proper transverse positions, as well as longitudinally in the beam or work. In accordance with one feature of the invention, the punches or other tools are movable for this purpose, and a plurality of them may be moved symmetrically simultaneously and also automatically, and under the control of suitable settable devices, as set by the operator.

Actuating means for the perforating tools of any convenient or suitable form may be provided, so far as concerns many aspects of the invention. As embodied the punches or like tools are operated by hydraulic power, and the embodied form thereof will be described first in connection with the frame 160, and also as employing hydraulic power to actuate the punches.

Carried in the frame 160, or integral therewith, is a cylinder 330 having a suitable plunger 331. The end of the cylinder 330 is closed with a threaded cap 332 with which communicates the pipe 333. The pipe 333 may be provided with swivel joints 334, in a suitable manner to provide for the various movements of the parts.

Referring more particularly to the spacing mechanism controlling the flange punches, such as are used in the frame 160 (see especially Figs. 8, 27 and 28) as embodied, the plunger 331 is provided with a head 340, said head having side pieces 341 and 342 which are clamped together and to the plunger by a clamping bolt 343.

A threaded stud 344 is also fixed to the head 340 and is threaded into a corresponding recess in the plunger 331. In the head, and as shown, in the pieces 341 and 342 are provided suitable guides or grooves or recesses 345 and 346. In said guides or grooves 345 and 346 work two pieces 347 and 348, provided, respectively, with lugs 349 and 350, each of which lugs is internally threaded.

Mounted in the member 340, or in a recess in the face thereof, is a shaft 351, held from longitudinal movement by a collar 352, working in a suitable recess in the face of the member 340. The shaft 351 has a thread 353 at one end thereof engaging the lug 349 of the member 347 and an oppositely disposed thread 354 at the other end thereof engaging the lug 350 on the member 348. At the lower end of the shaft 351, Fig. 27, are shown a pair of bevel gears 360 fixed upon a shaft 361 constituting driving means therefor. The gears 360 are suitably supported and kept in mesh by bracket 362.

In the front of sliding member 347 (referring especially to Fig. 27) is a carrier 363 for punches 364 and 365. These punches 364 and 365 are slidably mounted in the carrier 363, and said punches are provided respectively, with heads 366 and 367, which limit their outward movement in a downward direction, referred to in Fig. 28. Said punches are provided with resilient means for restoring and holding them in position, such as the respective springs 368 and 369.

Similar devices are provided in connection with the sliding member 348, which need not be described in detail, the carrier for the punches being indicated by reference numeral 370 (in Fig. 27) and the punches by 371. Further detailed description thereof is not deemed necessary, as in all substantial respects, they may correspond to the mechanism just described.

Suitable means are provided for keeping the dies in register with their corresponding punches, and as provided herein, in the frame 160, or in the corresponding frame on the other side, there are provided grooves 375. In said grooves travels a sliding member 376, kept in fixed position relatively to the sliding member 347 by suitable means such as the rod or rods 377. The die or dies 378 are formed in the slides 376 or are carried thereby. A slide 379 is similarly kept in fixed position relatively to the slide 348 by a rod or rods 380. The slide 379 is provided with dies 381.

It will thus be seen that the slide 376 and the slide 347, by the various instrumentalities described, are kept in absolute alinement both vertically and horizontally and that the same is true with respect to the slides 348 and 379, thus insuring absolute register of all the punches and their dies with each other.

Means are provided for traveling the sets or groups of punches, represented by the punch or like tools 363 and 365, carried by the member 347, and by the punch 371 carried by the member 370 respectively, toward and from each other in order to properly position or dispose the perforations transversely of the web. As embodied the punch carrying members 347 and 370 are moved toward and from each other, each carrying the punches thus to the desired positions. In Fig. 27 the solid lines show the punches close together in position to make perforations close to the web of the beam $x$, and the dotted line position shows the two groups of punches separated from each other and adapted to perforate the flanges at a considerable distance from the web. In accordance with one feature of the invention the punch carrying members are moved systematically and simultaneously and such movement is controlled by the operator at the controlling station for all the distance determining devices. The corresponding positions of the slides 347 and 376, and of the slides 348 and 379, are likewise shown in dotted line in Fig. 27. The shaft 361 is rotated to rotate the shaft 351 to effect the spacing or positioning of the punches.

As a matter of conciseness, the description has been applied to but one of the flange punching mechanisms, but it will be understood that in their essentials both punching mechanisms may be the same or similar, or substantially so. It will be understood that in Fig. 8, the general frame of the left hand flange punch is indicated by the reference numeral 382, and the corresponding parts in greater detail are given the same numbers as upon the other flange punch mechanism already described.

In Fig. 27, which so far as its general position is concerned, corresponds to the left hand frame 382 (referring to Fig. 8) the shaft 361 (see also Fig. 4) is connected by means of a pair of bevel gears 400 with a shaft 401. The corresponding shaft from the other flange punching device 160 is indicated in Fig. 4, by reference numeral 402. Said shaft 402 connects by means of a pair of miter gears 403 with a shaft 404. In the embodied form and in accordance with one principle of the invention, hand operating means are provided for rotating the shafts 361 and 403 to space the two groups of coöperating flange punches toward and from each other in the general manner already described. The particular embodied form of such means (shown best in Figs. 4 and 40) comprises a crank 405 or other suitable rotating device for the shaft 401, and a corresponding device for the shaft 404. (In Fig. 4 shaft 401 is broken away and its actuating device omitted for the sake of clearness). The crank 405 is fixed on the shaft 404. Fixed also on said shaft is a disk 406 upon which are placed suitable indications or readings of a convenient denomination or unit of length, or a submultiple thereof, by way of example, the indications may be for fractions of an inch. A suitable disk 407 is also provided upon which larger units of length or subdivisions thereof may be indicated, as for example the inches, and suitable reducing connections will be provided therebetween, such as the gear 408, pinion 409 and gear 410. A suitable index or pointer 411 may also be provided. It will thus be seen that by rotation of the crank 405, the punches or like tools may be spaced to and fro as desired.

Means are provided in accordance with the invention for selecting one or more punches of each group for use in a particular operation. As embodied herein, and referring especially to Figs. 27, 28 and 28ª, said means comprises a movable gag or gags, or like interponents slidable into position with respect to one or more of the punches to render them operative or inoperative as desired on any particular operation. In the embodied form a gag 412 is shown slidable in the opening or guideway 413 in the member 363, and is movable by suitable connections located conveniently for the operator of the machine. Said gag 412 is provided with a recess 414, whereby it may present either a vacant space or an interponent back of both the punches 364 and 365, or back of either of them or back of neither, thereby rendering operative either one, or both, or neither of the punches upon the reciprocation of the plunger 331. It will be understood that if the gag is back of a punch when the plunger is reciprocated, it has no chance to give but will be pushed through the material. If the aperture in the gag be back of a punch, or the gag be moved out of line therewith, the spring 368 will yield and the punch will be merely pressed backward as it comes in contact with the material and will consequently make no perforations.

The embodied form of actuating or positioning means for the gags just described comprises an arm 415 for each gag, each such arm being pivoted by a pin and slot connection 416 to gag 414. Each arm 415 is fixed on a shaft 417. Fixed to the other end of each shaft 417 is an arm 418. A rod 419 is pivotally connected to each of the lower arms 418. Said rods 419 connect respectively by universal joints 420 with sliding rods 421, operated by latch levers 422 respectively. As shown, lever 421 is pivotally connected to a spring pressed bell crank lever 423 mounted upon the latch lever 422. Allowance is thus made for the travel of the punches as they are spaced apart or closed together in positioning them for making perforations at different places in the flange or corresponding part of the beam.

The corresponding controls for the other interponents or gags for the upper and lower flange punches on both sides of the beam or other shape may be the same or similar, and for the sake of brevity no detail description will be given, and corresponding reference numerals are applied to them all.

In the case of the gags or interponents for the upper punches, on each side of the work, as a matter of convenient construction, the arms 418 are connected by pivoted links 432 to corresponding arms 431. The arms 431 are fixed on corresponding short shafts 430. Fixed also to each shaft 430 is an arm 433, pivotally connected to the corresponding rod 419.

In Figs. 29 and 30 a somewhat different form of mechanism is shown for the punches, which perforate the flange or corresponding part of the shape. In said form each punch and its corresponding die are carried in an integral sliding member 450. Said sliding member 450 works in guides 451 and 452 in the frame 382, or the corresponding frame 160, and the surfaces 453 and 454 also act as guides therefor. The punches 364 and 365 have their heads 455 and 456 traveling in corresponding T grooves 457 in the head of the plunger 331. The punches may be slid in these grooves, and thus be moved toward and from each other to locate the perforations transversely of the beam. Suitable means, such as springs 458 and 459 serve to hold the punches to their seats in the head of the plunger 331. Many of the features of description already given in connection with the particular mechanism shown in Figs. 27, 28 and 28ª, as well as other figures, will be considered as applying also to Figs. 29 and 30, and therefore need not be repeated.

Means are provided in accordance with certain principles of the invention for traveling and variously positioning the web punches in a direction transverse to the beam, so as to bring the perforations at the desired point or points, said means coöperating with suitable members in the means for positioning the beam longitudinally; these two means serving to position any given perforation both along and across the beam.

In accordance with certain features of the invention, said means for transversely positioning the punches or like tools, are automatically controlled by settable distance controlling devices under the control of the operator. In the embodied form of such means, (Figs. 2, 6, 8, 31 to 36) it is applied to a hydraulically actuated punch or punches. In said embodied form, a cylinder 480 is shown transversely slidable upon the housing or frame 481. Suitable shoulders at 482 and corresponding shoulders at 483 are provided whereby said cylinder is held in position vertically, and the weight and also the thrust is taken up by the frame of the machine. Suitable piping 484, with proper and adequate swivel joints is provided for supplying fluid pressure to the cylinder 480. The cylinder 480 is slidable to the right and left, referred to in Fig. 8, the shoulders 482 and 483 acting as guides and bearings. The cylinder 480 is provided with a plunger 485, which actuates the web punches 486. The corresponding die block 487 is slidable in like manner on the frame 481 in shouldered guides 489 and 490, the punches and dies thus being maintained in accurate register. (See Figs. 6, 8, and 31).

Means are provided for moving the punches and dies to the right and left, referred to in Fig. 8, as may be desired or necessary, and for maintaining them in absolute register when being so moved. In the embodied form of such means (see especially Figs. 2, 8 and 31), a rack bar 500 is fixed to the cylinder 480. Said bar 500 meshes with a pinion 501 fixed to shaft 502. Said shaft 502 is carried by a bracket 503 fixed to the frame 481. Said shaft 502 is provided with a pair of collars 504 and 505 which serve to support the shaft 502 upon the bracket 503, and to keep the rack bar 500 and the pinion 501 in mesh with each other. A roller 506, carried in a suitable bracket 507 acts against the back of the rack bar 500, and holds the rack to the pinion. Fixed to the die block 487 is a corresponding rack bar 510 meshing with a similar pinion 511. Suitable collars 512 and 513 are likewise fixed to the shaft 502, the collar 513 resting on a bracket 514 likewise carried by the frame 481. The shaft 502 is suitably driven as by a pair of miter gears 515 connecting it with a shaft 516. Said shaft 516 connects with a suitable distance controlling device or automatic positioning mechanism 517, said mechanism having a keyboard or other settable means for securing the proper feeds. Said device or mechanism may be generally similar to that shown in my copending application for Patent Serial No. 704,819, heretofore referred to. Fixed to the shaft 516 is a worm wheel 519 coöperating with a suitable worm, which may be connected to or fixed upon the shaft 520 of the motor 521, in general conformity with my said copending patent application.

Means are provided by the invention for returning the web punches to an initial position after each punching. In accordance with certain features of the invention, said returning mechanism operates automatically after each punching operation.

In the embodied form of such means automatic devices are provided, including a three arm lever 522 conveniently pivoted at 523 upon the cylinder 480. A rod 524 is slidable to and fro in a suitable apertured bearing which bearing is mounted on cylinder 480. Said rod 524 at its lower extremity is fixed to the plunger 485 by suitable fastening devices such as a tap bolt 526. The rod 524 thus slides to and fro with the plunger 485. Carried on the rod 524 is a tripping latch 527 having a suitable pivotal spring mounting 528, whereby the latch is adapted to yield as the rod 524 moves in a downward direction and to remain rigid as the rod moves in the opposite direction. Coöperating with the latch 527 is an arm 529 of the lever 522. Fixed on the frame 481 is a suitable tripping lug 530 adapted to coöperate with another arm 531 of the lever 522. The remaining arm 532 of the lever 522 works as a bridge piece or circuit making and breaking means, between a set of terminals 533 and a set of terminals 534, in the circuit of the motor 521, the wiring for the set of terminals 533 and 534 being arranged to reverse the polarity of the motor 521. A suitable friction clutch or other connection such as a spline or key operated clutch, is provided between the shaft 516 and the motor 519, substantially as set forth in my said copending application Serial No. 704,819 heretofore referred to.

The manner of operation of the described mechanism is substantially as follows:

The original or initial position of the determining device may be taken at any suitable point, such as a predetermined distance from the alining rolls 151. The keyboard 518 is then manipulated or set by the operator for the desired distance at which the perforation or perforations are to be made, and the mechanism connects the shaft 516 to the motor 521 and the shaft is permitted to rotate sufficiently to give a feed to the punches 486 and the die block 487, corresponding to the setting of the keyboard 518. The lever 522 at this time is in the full line position shown in Fig. 31. As the plunger 485 is actuated, it draws rod 524 downward (Fig. 31) and the latch 527 passes the arm 529, and in doing so the latch yields without actuating the arm. The latch 527 is then below the arm 529. As the plunger 485 is restored, the rod 524 moves upwardly and the latch 527 engages the arm 529 and throws the lever 522 to the dotted line position shown in Fig. 31. This throws the arm 532 from the terminals 533 to the terminals 534, thus reversing the motor 521. This causes the shaft 516 to rotate in the opposite direction, and through the mechanism hereinbefore described, the punches 486 and die blocks 487 are fed back in the opposite direction preparatory for a subsequent operation. As the mechanisms above referred to move toward the left in Fig. 31, the lug 530 encounters the arm 531 of the lever 522, which lever is at such time in the dotted line position shown in Fig. 31, and throws the lever 522 to the full line position shown in Fig. 31. This brings the arm 532 back to the terminals 533 and again reverses the motor 521. The motor 521 is now running in a manner adapted to give a new positioning to the punches 486 and die block 487 as soon as the operator again sets the keyboard 518. It will be understood, of course, that in its broader aspects these features of the invention are adapted to control different kinds of motors, in addition to an electric motor, such as is shown and described.

Means are provided by the invention for compensating for differences in the thickness of metal between the punch and die in connection with the web punch, that is, means are provided for bringing the die firmly against the metal irrespective of its thickness. In the embodied form of such means, the frame 481, which frame carries the cylinder 480, the punches 486 and the die block 487 is mounted to have slight vertical movement in frame pieces 730. Said frame 481 is resiliently mounted as upon springs 731, the whole of this structure being carried upon the frame 166. It will thus be clear that when pressure is applied to the plunger 485, the die block will be drawn firmly against the underside of the web (see especially Fig. 8) and the perforation will then be made.

Means are provided by the invention for selecting any desired punches, or any number or arrangement thereof which may be desired, said means being under the control of the operator, and preferably under the control of the operator at the distance determining devices. The embodied form thereof comprises interponents movable by the operator. As embodied, (Figs. 33, 34, 35 and 36) the head of the plunger 485 has applied thereto the punch holding member 540 secured in a suitable manner, as by tap bolts 541. The various punches 486 are carried in apertures in the tool holding member 540 and they have heads 542 setting in suitable recesses in said member limiting their movement and positioning them accordingly. In the recess or space 543 formed between the plunger and the tool holding member 540 works an interponent or gag 544. Said gag is shown provided with a recess 545, and it is connected up with a suitable actuating and positioning means by slotted connection 546. The bolt 541 may conveniently work in the slot 545.

In the embodied form of actuating means for the gag or interponent 544, a rod 560 works in the slot 546, said rod 560 being pivotally carried by arms 561 and 562, which arms are pivotally mounted on the machine frame. Fixed to move with the arm 562 is an arm 563. A rod 564 is pivotally connected to the arm 563. Said rod 564 connects by a universal joint 565 with a slidable rod 566, said rod 566 being carried in a suitable bearing 567 and it is actuated by one of the levers 422.

The manner of operation of said mechanism is substantially as follows:

Figs. 32 to 36 illustrate various positions of the gag relatively to the punches. Fig. 32 shows in solid lines the same position of the mechanism as is shown in Fig. 33. These two figures show neither of the punches actuated on the reciprocation of the plunger. Fig. 34 shows the left hand punch only being actuated, and the right hand punch merely being lifted and yielding backwardly by coming in contact with the metal. Fig. 35 shows both punches being actuated, and Fig. 36 shows only the right hand punch being actuated. The slot 546 gives allowance for the travel of the gag with the plunger and relatively to the rod 560.

Figure 7:
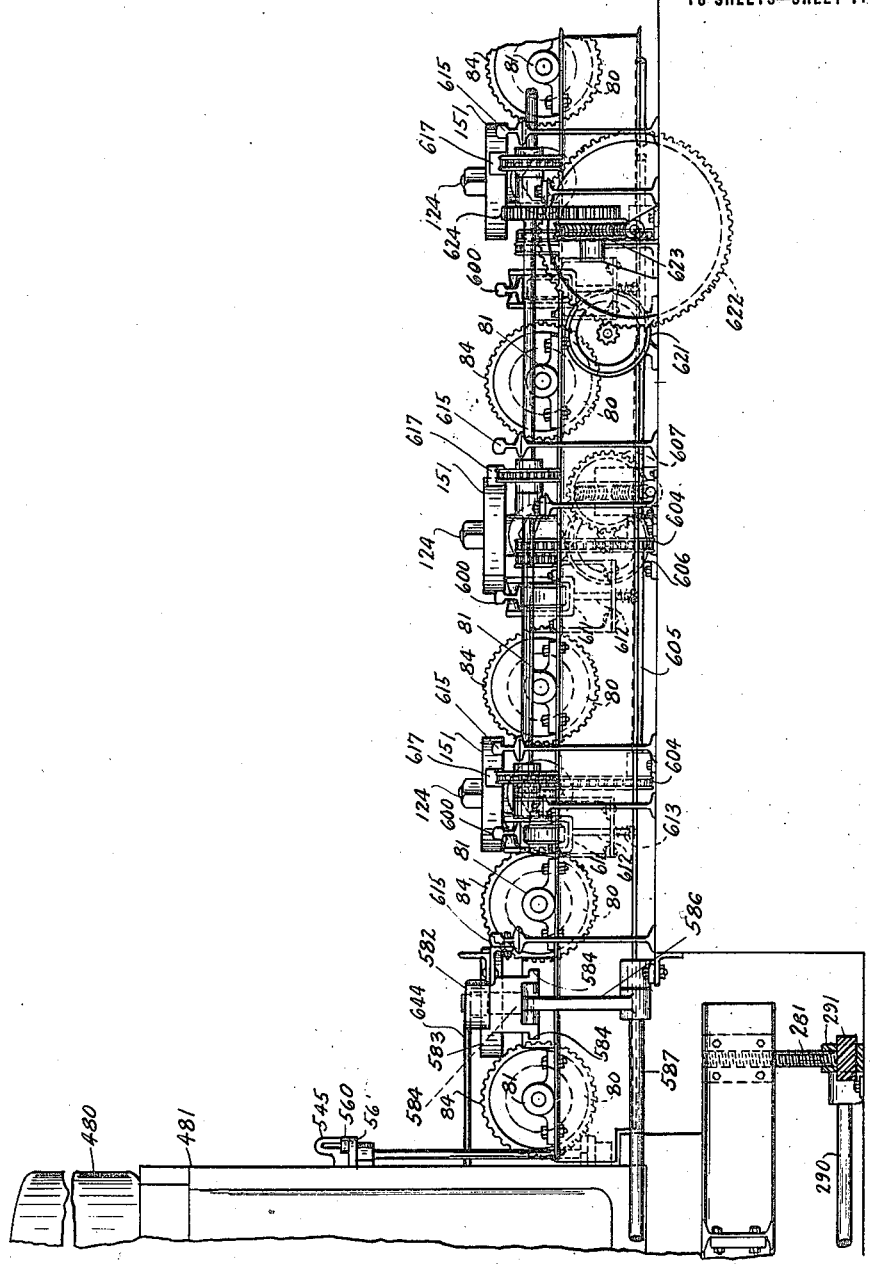

Additional alining means are provided for the beam as it is progressed through the machine, such as the alining roller 580, carried in bracket 581, which bracket is mounted upon frame 160 (Figs. 2 and 7). Alining means are provided in accordance with one feature of the invention, adapted to aline the work transversely beyond the tool equipped means, said alining means being automatically positioned by the fed-in beam or shape. In the embodied form of such means, a roller 582 is rotatably supported upon a slide 583 by means of a suitable stem or spindle 584, which spindle rests in an aperture in the slide 583, and permits the roller 582 to rotate. The slide 583 is mounted in guides 584 in the machine frame. Pivotally connected to said slide 583 is a link 585, which link is also pivotally connected to an arm 586. Said arm 586 is fixed to a shaft 587, and fixed also to said shaft 587 is an arm 588. The arm 588 has connected thereto a pivoted link 589, which link at its other end embraces and is slidable along the guide 590, mounted upon the frame 160. It will be understood, therefore, that as the frame 160 is automatically brought to position with respect to the beam or other work newly supplied, that the roller 582 will be moved to a corresponding position to accurately aline the beam between itself and the corresponding roller 151.

Suitable means for delivering or discharging the beam after the work thereon is completed are provided, and, as embodied herein, means are provided for moving the beam transversely of its length and carrying it away. Said means in accordance with one feature of the invention, is further adapted to lift the work from the rolls 80 and carry it away transversely. Said means for lifting the beam and carrying it transversely (see especially Figs. 3, 7, 37 and 38), comprise lifting rails or members 600, mounted upon cams 601, carried, respectively, upon shafts 602 which operate substantially as the similar constructions at the other, or receiving end of the machine, and the same general description in many of the features will apply thereto without repetition. The shafts 602 are driven in a suitable manner, as by sprocket chains and wheels 603 and 604 from a suitable shaft 605. A suitable drive is provided for said shaft 605, such as a motor 606, having suitable connections, such as a gear and pinion 607 and worm and worm wheel 608, to said shaft 605. Suitable restoring means are provided for the rails or members 600, such as suitable weights or springs 609. The rails or supports 600 are held to their cams 602 by suitable means, such as the tapered rolls 610 engaging the side of said rails. The rolls 610 are mounted in forked frames 611, which frames have stems 612 resiliently acted upon by springs 613.

Means are provided for receiving the discharged work from the rails and members 600, the embodied form thereof comprising a series of stationary rails 615, upon which the beam or other shape is adapted to be laid along and slid transversely of its length to a proper position for final delivery. Means are provided for sliding the beam along the rails 615, comprising sprocket chains 616, to which are fixed suitable lugs 617. Said sprocket chains are carried over sprocket wheels 618, which wheels are carried upon suitable shafts 619. A drive is provided for the sprocket chains 616, as shown, comprising a shaft 620 driven from a suitable source of power, such as a motor 621 having suitable driving connections to said shaft, such as a gear and pinion 622, worm and worm wheel 623 and gears 624.

The rails or supports 600 (see especially Figs. 37, 38) rise upwardly beneath the beam $x$ to the dotted line position shown in said figure, thus lifting the beam clear of the rolls 80. The beam is then moved to the right, to the intermediate position thereof, shown in said Fig. 37. The right hand flange is then engaged by lugs 617, and the beam is slid along the rails 615 in a manner which will be clearly understood. This prevents any dragging of the beam along the rolls 80.

A suitable rail 625 serves to aline the beam as it is dragged off.

Means are provided for controlling the movement of the feeding in and feeding out rails, and coöperating devices, and also the movement of the forwarding rolls 80, in harmony with the handling of the material or work through the machine. As a part of said means, the pivotally mounted circuit controlling lever 190, (previously referred to in connection with another service imposed thereon in the present embodiment,) (see Fig. 2) controls a switch 632 in the circuit for the driving motor 97, which motor drives the rolls 80. Said lever 190 in its other position closes the switch 634 located in the circuit for the driving motor 61, which drives the feeding-in rails 40. Suitable spring connections between the actuating lever 190 and the switches may be provided, if desired, to give a quick break, in a well known manner.

A switch controlling lever 630 is also provided, suitably mounted at 631, (see Figs. 2 and 3) which controls a suitable switch 640, preferably arranged in parallel with the switch 632 in the circuit for the driving rolls 80. Said lever 630 also controls a switch 641 in the circuit for the motor 61, which motor drives the feeding in rails 40, and such switch is preferably in parallel with the switch 634. A switch controlling lever 642 is pivotally mounted at 643 (see Fig. 3) and connected by a pivoted rod 644 to the switch controlling lever 630 (see Figs. 2 and 3). Said lever 642 also controls a switch 645 in the circuit of the motor 606, which motor drives the feeding off rails 600.

The manner of operation of these devices as shown and described is substantially as follows: When the beam or shape is fed in, the lever 190 closes the circuit for the rolls 80, which are thus brought into motion. At the same time the circuit is broken for the feeding in rails 40, which are thus stopped.

As the beam is fed through the machine, it passes out of contact with the lever 190, which then swings back to its former position, and closes the circuit for the feeding in rails 40, but the rails cannot start until a later point in the travel of the beam. The beam next passes beyond the switch controlling lever 630. The circuit 640 is thus closed, and this keeps the feed rolls 80 in motion notwithstanding the change in position of the lever 190. The switch 631 being open, the feeding in rails 40 are still kept out of operation. When the beam passes beyond the lever 642, the switch 631 is closed and the feeding in rails 40 are started into motion, and by reason of the switch 640 being opened, the rolls 80 are stopped. This movement also closes the switch 645 and starts the rails 600 into motion to feed off the beam.

In Fig. 42 of the drawings a wiring diagram is shown which may be used in connection with the various controls and motors and which will be understood without further description. At 650 are shown a series of hand switches which may be located at a convenient point for a single operator (see Fig. 4) to operate them in connection with the various settable distance controlling means, tool selecting devices, etc. Thus a single operator from one permanent station may practically control the machine at all times.

It will be understood from all the foregoing that a machine has been provided which realizes the objects of invention and the advantages herein set forth, together with other objects and advantages.

It will be understood that in many of its features, the machine is especially adapted and capable of handling heavy structural work, and of perforating such work rapidly and well within the limits of commercial precision, that by means of the various controls being located at a central station, the machine is operative practically by a single person, and that it provides and combines novel and efficient mechanism for obtaining these objects, as well as others necessary or desirable in connection with such work. The machine is adapted to operate exceedingly speedily upon work of this kind, the mechanical handling of the work being simple and expeditious, and the positioning of the work relatively to the tool being practically instantaneous and effected without any trials or delays whatsoever.

While a machine has been illustrated, as operating upon an I-beam, it will be understood that other kinds and forms of structural shapes may be perforated by the machine in substantially the same manner.

The invention in its broader aspects is not limited to the mechanisms herein shown and described, nor to any particular mechanisms, but many changes may be made thereupon without departing from the principles of the invention and without sacrificing its chief advantages.

What I claim as my invention is:—

1. A machine for perforating structural shapes, including in combination tool equipped means, shape progressing and positioning means comprising a head movable along the path of said shape and means frictionally holding the shape to said head, and distance determining devices controlling the movements and positions of said head.

2. A machine for perforating structural shapes, including in combination tool equipped means, shape progressing and positioning means comprising a head movable along the path of said shape, and means frictionally holding the shape to said head and settable distance determining devices comprising a keyboard having keys representing distance denominations and values and controlling the movements and positions of said head.

3. A machine for perforating structural shapes including in combination tool equipped means, shape progressing and arresting means comprising a head movable along the path of said shape and acting to permit or prevent the travel of said shape, and distance determining devices including selectively settable members representing distance denominations and values and controlling the movements and position of said head.

4. A machine for perforating structural shapes including in combination tool equipped means, shape progressing and arresting means comprising a head movable along the path of said shape and acting to permit or prevent the travel of said shape, distance determining devices controlling the movements and position of said head, and means impelling said shape continuously forward against said head.

5. A machine for perforating structural shapes including in combination tool equipped means, means for progressing a shape along a path past said tool equipped means, said progressing means comprising a plurality of driven members upon which the shape rests and by which it is progressed, and distance determining devices for permitting and preventing the movement of said shape with respect to the tool equipped means.

6. A machine for perforating structural shapes including in combination tool equipped means, means for progressing a shape along a path past said tool equipped means, said progressing means comprising a plurality of continuously driven members upon which the shape rests and by which it is progressed, and distance determining devices for permitting and preventing the movement of said shape with respect to the tool equipped means.

7. A machine for perforating structural shapes including in combination tool equipped means, means for progressing a shape along a path past said tool equipped means, said progressing means comprising driven rotary members arranged along said path and engaging said shape to progress it, and distance determining devices for permitting and preventing the movement of said shape with respect to the tool equipped means.

8. A machine for perforating structural shapes including in combination tool equipped means, means for progressing a shape along a pathway past said tool equipped means, said progressing means comprising rotating members stationary at a plurality of points along said pathway and in contact with said shape to progress it, and distance determining devices for permitting and preventing the movement of said shape with respect to the tool equipped means.

9. A machine for perforating structural shapes including in combination tool equipped means, means for progressing a shape along a pathway past said tool equipped means, said progressing means comprising a plurality of members located at a plurality of points along said pathway and in traveling contact with said shape to progress it, a head in engagement with said shape, and distance determining devices controlling the movements of said head to locate the shape with respect to the tool equipped means.

10. A machine for perforating structural shapes including in combination tool equipped means, means for progressing a shape along a pathway past said tool equipped means, said progressing means comprising a plurality of rotatable members stationary at a plurality of points along said pathway and in contact with said shape to progress it, a head in engagement with said shape, and distance determining devices controlling the movements of said head to locate the shape with respect to the tool equipped means, said distance determining devices comprising a keyboard with keys representing distance denominations and values.

11. A machine for perforating structural shapes including in combination tool equipped means, means for progressing a shape along a pathway past said tool equipped means, said progressing means comprising a plurality of traveling members located at a plurality of points along said pathway, said shape resting upon said members and being progressed thereby, a head in engagement with said shape, and distance determining devices including a keyboard with keys representing distance denominations and values, and adapted to permit or prevent the movement of said head as impelled forward by said beam to locate the shape with respect to the tool equipped means.

12. A machine for perforating structural shapes including in combination tool equipped means, means for progressing a shape along a pathway past said tool equipped means, said progressing means comprising a plurality of rotating members located at a plurality of points along said pathway, said rotating members supporting and progressing said shape, and settable distance determining devices, including a plurality of members representing distance denominations and values therein, for controlling the movement of the shape relative to said tool equipped means.

13. A machine for perforating structural shapes including in combination tool equipped means, means for progressing a shape along a pathway past said tool equipped means, said progressing means comprising a plurality of continuously driven rotating members located at a plurality of points along said pathway, said rotating members supporting and progressing said shape, and settable distance determining devices, including a plurality of members representing distance denominations and values therein, for controlling the movement of the shape relative to said tool equipped means.

14. A machine for perforating structural shapes including in combination tool equipped means, means for progressing a shape along a pathway past said tool equipped means, said progressing means comprising a plurality of rotating members located at a plurality of points along said pathway, said rotating members supporting and progressing said shape, and settable distance determining devices for controlling the movement of the shape relative to said tool equipped means, said settable distance determining devices including a key board located at a central station and means likewise located at said central station for spacing the tools with respect to each other and to the shape.

15. A machine for perforating structural shapes including in combination tool equipped means, means for progressing a shape along a pathway past said tool equipped means, said progressing means comprising a plurality of rotating members located at a plurality of points along said pathway, said rotating members supporting and progressing said shape, and means for permitting and preventing the progress of said shape, said means including settable distance determining devices, to position said shape relatively to said tool equipped means.

16. A machine for perforating structural shapes including in combination tool equipped means, means for progressing a shape along a pathway past said tool equipped means, said progressing means comprising a plurality of rotating members located at a plurality of points along said pathway, said rotating members supporting and progressing said shape, and means engaging said shape for permitting and preventing the progress of said shape, said means including settable distance determining devices controlling the movement of said permitting and preventing means to position said shape relatively to said tool equipped means.

17. A machine for perforating structural shapes including in combination tool equipped means, a series of progressing devices arranged in a horizontal pathway past said tool equipped means for progressing the shape, and distance determining devices for permitting and preventing the progression of the shape by said progressing means, said distance determining devices comprising members selectively settable for the various distances values and fractions thereof.

18. A machine for perforating structural shapes including in combination tool equipped means, a series of progressing devices arranged in a horizontal pathway past said tool equipped means for progressing the shape, and settable distance determining devices for permitting and preventing the progression of the shape by said progressing means, said settable devices including members representing distance denominations and values thereof.

19. A machine for perforating structural shapes including in combination tool equipped means, a series of driven progressing devices arranged in a horizontal pathway past said tool equipped means for progressing the shape, and distance determining devices, including a keyboard representing distance denominations and values for permitting and preventing the progression of the shape by said progressing means.

20. A machine for perforating structural shapes including in combination tool equipped means, a series of driven progressing devices arranged at a plurality of successive points in a horizontal pathway past said tool equipped means for progressing the shape, and settable distance determining devices for permitting and preventing the progression of the shape by said progressing means.

21. A machine for perforating structural shapes including in combination tool equipped means, means for progressing a shape including a series of driven rotating progressing devices arranged in a horizontal pathway past said tool equipped means and at a plurality of successive points, and distance determining devices for permitting and preventing the progression of the shape by said progressing means.

22. A machine for perforating structural shapes including in combination tool equipped means, means for progressing a shape thereto, means for supplying shapes successively to said progressing means, and means acting automatically to keep a reserve group of shapes ready at the supply point to be taken successively by said supplying means.

23. A machine for perforating structural shapes including in combination tool equipped means, means for progressing a shape thereto, means for supplying shapes successively to said progressing means, and means for maintaining a reserve supply of shapes with one of them in position to be taken by said supplying means.

24. A machine for handling structural shapes including in combination shape progressing means, and a plurality of intermittently operating devices located at various points along the shape for frictionally supporting and advancing a plurality of shapes and maintaining them at a particular place as a reserve supply for said progressing means.

25. A machine for handling structural shapes including in combination shape progressing means, and a plurality of traveling sets of successively operating devices located at various points along the shape and traveling transversely to the length of the shape for advancing a plurality of shapes and maintaining them at a place of supply for said progressing means.

26. A machine for handling structural shapes including in combination shape progressing means and a plurality of sets of devices located at various points along a shape, the devices of each set acting successively to forward the shape sidewise to said progressing means.

27. A machine for handling structural shapes including in combination shape progressing means and a plurality of sets of devices located at various points along a shape, the devices of each set acting successively to lift and forward the shape to said progressing means.

28. A machine for handling structural shapes including in combination shape progressing means, and a plurality of sets of devices located at various points along a shape for successively lifting and forwarding the shape in a direction transversely to its length to said progressing means.

29. A machine for handling structural shapes including in combination shape progressing means, and a plurality of sets of devices located at various points along a shape for successively forwarding the shape to said progressing means and means for speeding up the shape as it is delivered to said progressing means.

30. A machine for handling structural shapes including in combination shape progressing means and a plurality of sets of devices located at various points along a shape, the devices of each set acting successively to forward the shape to said progressing means and means for speeding up the shape as it is delivered to said progressing means.

31. A machine for handling structural shapes including in combination shape progressing means and a plurality of sets of devices located at various points along a shape, the devices of each set acting successively to forward the shape in a direction transversely to its length to said progressing means and means for speeding up the shape as it is delivered to said progressing means.

32. A machine for handling structural shapes including in combination shape progressing means, and a plurality of traveling devices located at various points along the shape and traveling transversely to the length of the shape for advancing a plurality of shapes and maintaining them at a place of supply for said progressing means, and means for speeding up the foremost shape and delivering it to said progressing means.

33. A machine for handling structural shapes including in combination shape progressing means, and a plurality of sets of devices located at various points along a shape for successively lifting and forwarding the shape in a direction transversely to its length to said progressing means, and means for speeding up the foremost shape and delivering it to said progressing means.

34. A machine for operating upon structural shapes including in combination tool equipped means, means for progressing a shape thereto, a plurality of stationary supports for a shape extending transversely of its length and means located at various points along the length of said shape for lifting a shape from said stationary supports and forwarding the shape along said supports.

35. A machine for perforating structural shapes including in combination a plurality of set of tool equipped means for operating upon different parts of a shape, means for progressing a shape relatively to said sets of tool equipped means, and means for moving said sets of tool equipped means transversely to the path of travel of said shape to bring them into operative relation with shapes of different sizes.

36. A machine for perforating structural shapes including in combination a plurality of sets of tool equipped means for operating upon different parts of a shape, means for progressing a shape relatively to said sets of tool equipped means, and automatic means for moving said sets of tool equipped means transversely to the path of travel of said shape to bring them into operative relation with shapes of different sizes.

37. A machine for perforating structural shapes including in combination a plurality of sets of tool equipped means for operating upon different parts of a shape, means for progressing a shape relatively to said sets of tool equipped means, and means controlled by the size of the shape for moving said sets of tool equipped means transversely to the path of travel of said shape to bring them into operative relation with shapes of different sizes.

38. A machine for perforating structural shapes including in combination a plurality of sets of tool equipped means for operating upon different parts of a shape, means for progressing a shape relatively to said sets of tool equipped means, and means controlled by the size of the shape for automatically moving said sets of tool equipped means transversely to the path of travel of said shape to bring them into operative relation with shapes of different sizes.

39. A machine for perforating structural shapes including in combination a plurality of sets of tool equipped means for operating upon the different parts of a shape, means for progressing a shape relatively to said tool equipped means, and automatic means for adjusting said tool equipped means for shapes of different sizes.

40. A machine for perforating structural shapes including in combination a plurality of sets of tool equipped means for operating upon the different parts of a shape, means for progressing a shape relatively to said tool equipped means, and means controlled by the size of the shape for adjusting said tool equipped means for shapes of different sizes.

41. A machine for perforating structural shapes including in combination a plurality of sets of tool equipped means arranged both horizontally and transversely, means for progressing a shape along a horizontal pathway past said sets of tool equipped means, and means for vertically adjusting said sets of tool equipped means for shapes of various sizes.

42. A machine for perforating structural shapes including in combination a plurality of sets of tool equipped means arranged both horizontally and transversely, means for progressing a shape along a horizontal pathway past said sets of tool equipped means, and means acting automatically for vertically adjusting said sets of tool equipped means for shapes of various sizes.

43. A machine for perforating structural shapes including in combination a plurality of sets of tool equipped means arranged both horizontally and transversely, means for progressing a shape along a horizontal pathway past said sets of tool equipped means, and means controlled by the size of the supplied shape for vertically adjusting said sets of tool equipped means for shapes of various sizes.

44. A machine for perforating structural shapes including in combination a plurality of sets of tool equipped means, means for feeding a shape along a horizontal pathway past said tool equipped means, and means controlled by the size of the supplied shape for horizontally moving said tool-equipped means into operative relation with said shape.

45. A machine for perforating structural shapes including in combination a plurality of sets of tool equipped means, means for feeding a shape along a horizontal pathway past said tool equipped means, and means controlled by the size of the supplied shape for horizontally moving said tool equipped means horizontally and vertically into operative relation with said shape.

46. A machine for perforating structural shapes including in combination a plurality of tool equipped means, shape progressing means, means for supplying shapes to said progressing means, and means for automatically measuring the length of said shape.

47. A machine for perforating structural shapes including in combination a plurality of sets of tool equipped means provided with a plurality of tools, means for progressing a shape relatively thereto, settable distance determining devices for positioning said shape relatively to said tool equipped means, means for selectively rendering said tools operative, and connections whereby said settable and selective means are controlled from one central station.

48. A machine for perforating structural shapes including in combination a plurality of sets of punching mechanisms, one mechanism being for the webs, and another for the flanges of the shapes, and common means for progressing a shape past said plurality of punching mechanisms.

49. A machine for perforating structural shapes including in combination a plurality of sets of punching mechanisms, one mechanism being for the webs, and another for the flanges of the shapes, and common means for progressing a shape past said plurality of punching mechanisms, and distance determining means for positioning the progressed shape relatively to all said punching mechanisms.

50. A machine for perforating structural shapes including in combination a plurality of sets of punching mechanisms, one mechanism being for the webs, and another for the flanges of the shapes, and common shape progressing means for said plurality of punching mechanisms, and distance determining means comprising a plurality of settable members representing distance values for positioning the progressed shape relatively to said various punching mechanisms.

51. A machine for perforating structural shapes including in combination a plurality of sets of punching means for operating upon the web of a shape, punching mechanisms for operating upon the flange of the shape, located in series along the path of the shape, and means for progressing and positioning said shape relatively to all said punching mechanisms.

52. A machine for perforating structural shapes including in combination a plurality of sets of punching mechanisms for operating upon the flange of the shape located in series along the path of the shape, and means for progressing said shape relatively to all said punching mechanisms, and distance determining devices for selectively positioning the progressed shape relatively to said various punching mechanisms.

53. A machine for perforating structural shapes including in combination shape punching means, a head, distance determining means including selectively settable devices representing distance denominations and fractions controlling the travel and positioning of said head, and means for progressing said shape past said punching means and for pressing it against said head.

54. A machine for perforating structural shapes including in combination shape punching means, a head adapted to travel widely varying distances, distance determining means including selectively settable devices representing distance denominations and fractions controlling the travel and positioning of said head, and means for progressing said shape past said punching means and for pressing it against said head.

55. A machine for perforating structural shapes including in combination shape punching means, a head, distance determining means including an organized group of selectively settable devices representing distance denominations and fractions controlling the travel and positioning of said head, and means for progressing said shape past said punching means and for pressing it against said head.

56. A machine for perforating structural shapes including in combination shape punching means, a head adapted to travel widely varying distances, distance determining means including an organized group of selectively settable devices representing distance denominations and fractions controlling the travel and positioning of said head, and means for progressing said shape past said punching means and for pressing it against said head.

57. A machine for perforating structural shapes including in combination a punch, means for traveling a shape longitudinally past the punch, means for traveling the punch across the beam, and distance determining devices for controlling the crosswise travel of the punch, to transversely locate the holes in the shape.

58. A machine for perforating structural shapes including in combination a punch, means for traveling a shape longitudinally past the punch, means for traveling the punch across the beam, and distance determining devices, including a keyboard with keys representing distance denominations and values, for controlling the crosswise travel of the punch, to transversely locate the holes in the shape.

59. A machine for perforating structural shapes including in combination a punch, means for traveling a shape longitudinally past the punch, means for traveling the punch across the beam, and distance determining devices, including a plurality of settable devices representing distance denominations and values, for controlling the crosswise travel of the punch, to transversely locate the holes in the shape.

60. A machine for perforating structural shapes including in combination a punch, means for traveling a shape longitudinally past the punch, distance determining devices for successively positioning the shape longitudinally to be punched by the punch, means for traveling the punch across the beam, and distance determining devices for controlling the crosswise travel of the punch, to transversely locate the holes in the shape.

61. A machine for perforating structural shapes including in combination a punch, means for traveling a shape longitudinally past the punch, distance determining devices for successively positioning the shape longitudinally to be punched by the punch, means for traveling the punch across the beam, and distance determining devices for controlling the crosswise travel of the punch to transversely locate the holes in the shape, all said distance determining devices being located at a central station.

62. A machine for perforating structural shapes including in combination a punch, means for traveling a shape longitudinally past the punch, distance determining devices for successively positioning the shape longitudinally to be punched by the punch, means for traveling the punch across the beam, and distance determining devices for controlling the crosswise travel of the punch to transversely locate the holes in the shape, all said distance determining devices including settable members corresponding to distance denominations and values.

63. A machine for perforating structural shapes including in combination a punch, means for traveling a shape longitudinally past the punch, distance determining devices for successively positioning the shape longitudinally to be punched by the punch, means for traveling the punch across the beam, and distance determining devices for controlling the crosswise travel of the punch, to transversely locate the holes in the shape, each of said distance determining devices comprising a keyboard representing distance denominations and values, the keyboards being located together at a central station.

In testimony whereof, I have signed my name to this specification, in the presence of two subscribing witnesses.

THEODORE P. PAYNE.

Witnesses:
 JOHN D. MORGAN,
 ROSE MENK.